(12) United States Patent
Sakakibara

(10) Patent No.: US 8,279,639 B2
(45) Date of Patent: Oct. 2, 2012

(54) DIRECT AC POWER CONVERTING APPARATUS

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 448 days.

(21) Appl. No.: 12/670,637

(22) PCT Filed: Aug. 22, 2008

(86) PCT No.: PCT/JP2008/064991
§ 371 (c)(1),
(2), (4) Date: Jan. 25, 2010

(87) PCT Pub. No.: WO2009/028412
PCT Pub. Date: Mar. 5, 2009

(65) Prior Publication Data
US 2011/0007531 A1   Jan. 13, 2011

(30) Foreign Application Priority Data

Aug. 28, 2007 (JP) ................................ 2007-220907
Mar. 26, 2008 (JP) ................................ 2008-081689

(51) Int. Cl.
*H02M 5/40* (2006.01)
(52) U.S. Cl. ............ 363/34; 363/132; 363/159; 318/722
(58) Field of Classification Search .............. 363/34–41,
363/56.01, 58–60, 89, 97, 98, 131, 132; 307/64–66,
307/105, 106, 108; 318/722, 800–811; 361/18,
361/42, 44, 90, 91
See application file for complete search history.

(56) References Cited

U.S. PATENT DOCUMENTS

| | | | |
|---|---|---|---|
| 5,075,838 A * | 12/1991 | Schnetzka et al. | 363/37 |
| 5,852,558 A * | 12/1998 | Julian et al. | 363/132 |
| 6,031,739 A * | 2/2000 | He et al. | 363/44 |
| 6,750,633 B2 * | 6/2004 | Schreiber | 322/12 |

(Continued)

FOREIGN PATENT DOCUMENTS

| | | |
|---|---|---|
| JP | 2-65667 A | 3/1990 |
| JP | 7-289766 A | 11/1995 |
| JP | 8-79963 A | 3/1996 |

(Continued)

OTHER PUBLICATIONS

Wei et al., Investigation of 9-switch Dual-bridge Matrix Converter Operating under Low Output Power Factor, Department of Electrical and Computer Engineering, The University of Wisconsin-Madison, vol. 1, pp. 176-181, 2003.

*Primary Examiner* — Rajnikant Patel
(74) *Attorney, Agent, or Firm* — Birch Stewart Kolasch & Birch, LLP

(57) ABSTRACT

A control section controls a current-source converter in a state in which a switch is in conduction, and performs voltage doubler rectification on a voltage between a neutral phase input line and any of input lines to provide for charging of clamp capacitors. Accordingly, the clamp capacitors are charged through a resistor, which prevents an inrush current from flowing therethrough. In addition, a voltage between both ends of a pair of the clamp capacitors is higher than, for example, a voltage between both ends of a pair of capacitors. Accordingly, even if the clamp capacitors and, for example, the capacitors are electrically connected to each other in a normal operation, it is possible to prevent the inrush current from flowing from the capacitors to the clamp capacitors.

13 Claims, 19 Drawing Sheets

U.S. PATENT DOCUMENTS

| | | |
|---|---|---|
| 6,912,142 B2 * | 6/2005 | Keim et al. ................ 363/89 |
| 6,995,992 B2 | 2/2006 | Wei et al. |
| 2006/0033466 A1 | 2/2006 | Yamada et al. |
| 2006/0145668 A1 | 7/2006 | Okubo et al. |

FOREIGN PATENT DOCUMENTS

| | | |
|---|---|---|
| JP | 8-98536 A | 4/1996 |
| JP | 2005-130650 A | 5/2005 |
| JP | 2006-54947 A | 2/2006 |

* cited by examiner

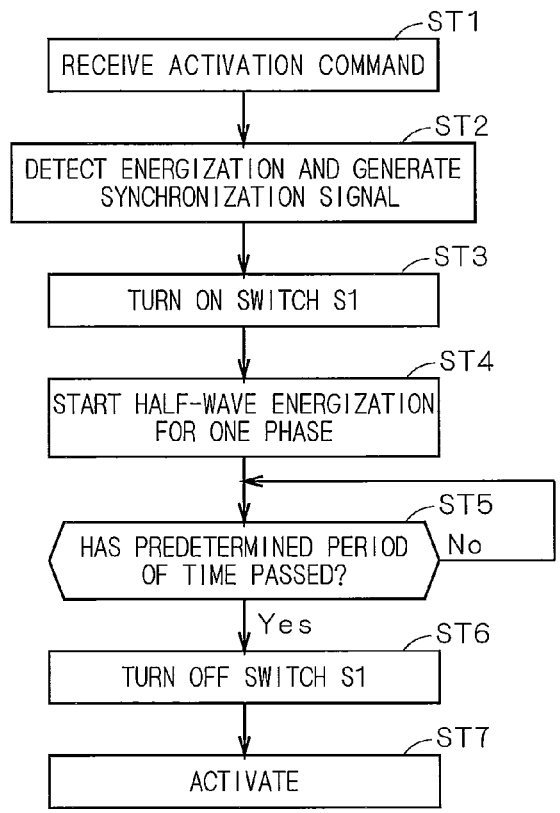
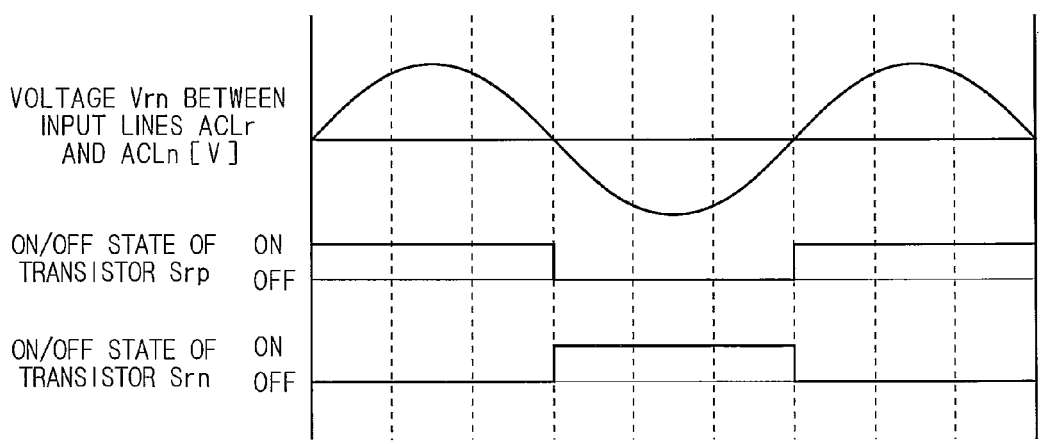

F I G . 4
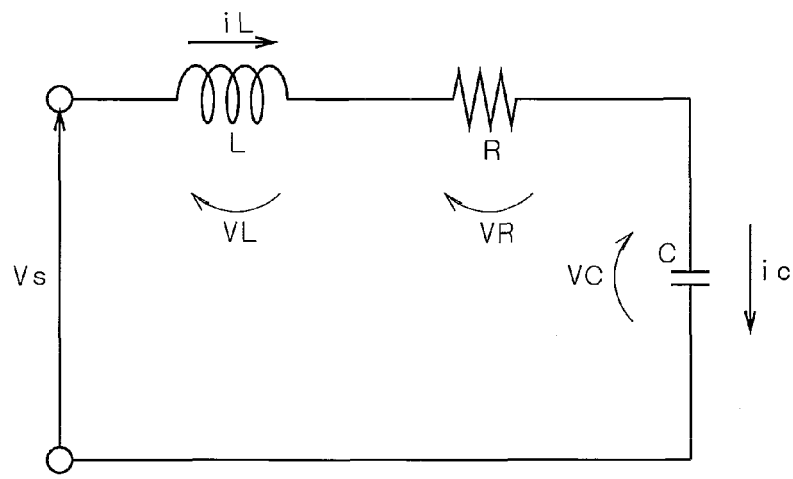
F I G . 5
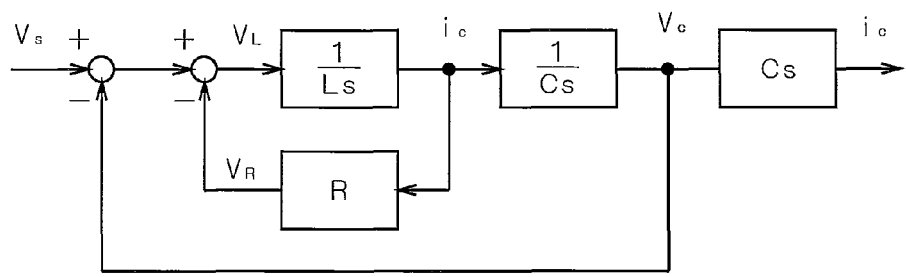
F I G . 6
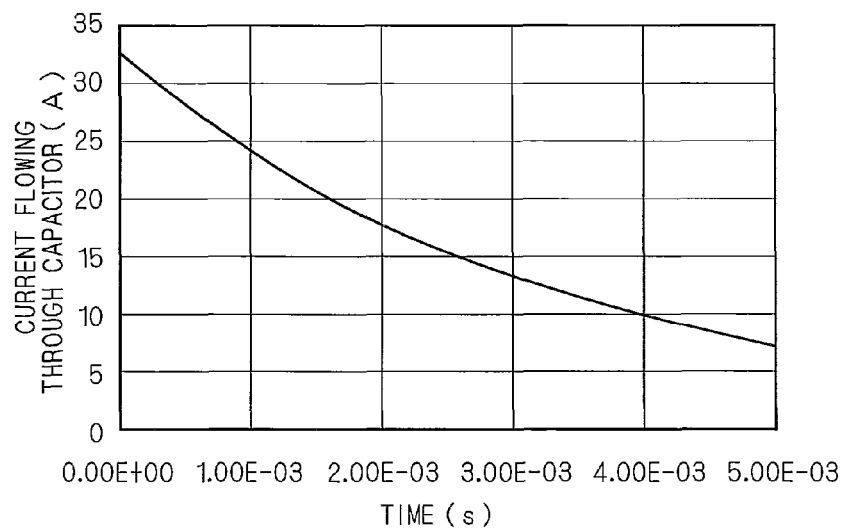

F I G . 7

|       | Srp | Ssp | Stp | Srn | Ssn | Stn |
|-------|-----|-----|-----|-----|-----|-----|
| I(rs) | 1   | 0   | 0   | 0   | 1   | 0   |
| I(rt) | 1   | 0   | 0   | 0   | 0   | 1   |
| I(st) | 0   | 1   | 0   | 0   | 0   | 1   |
| I(sr) | 0   | 1   | 0   | 1   | 0   | 0   |
| I(tr) | 0   | 0   | 1   | 1   | 0   | 0   |
| I(ts) | 0   | 0   | 1   | 0   | 1   | 0   |

F I G . 9
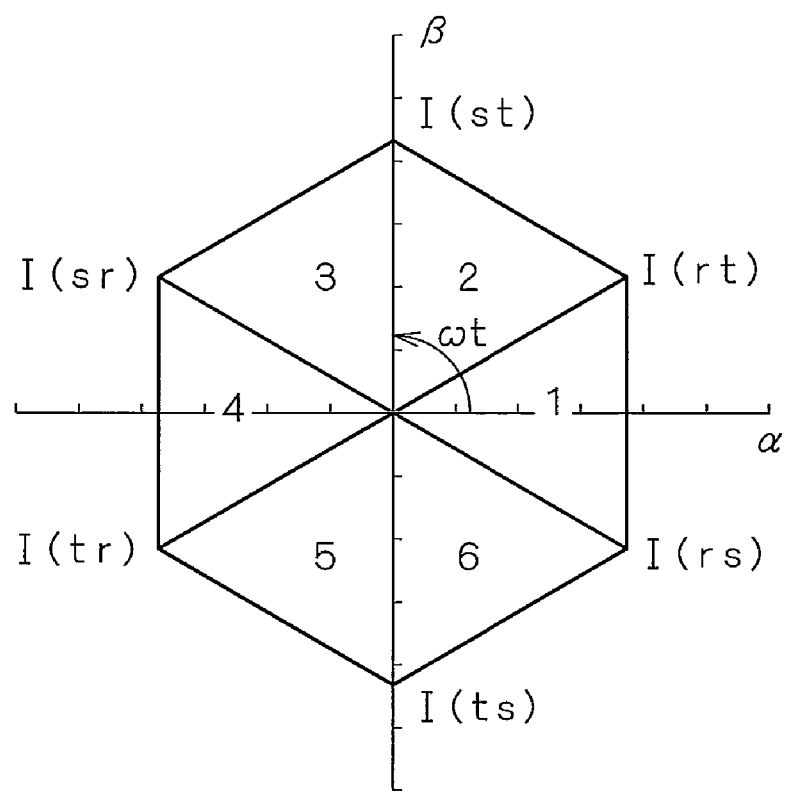

F I G . 1 0
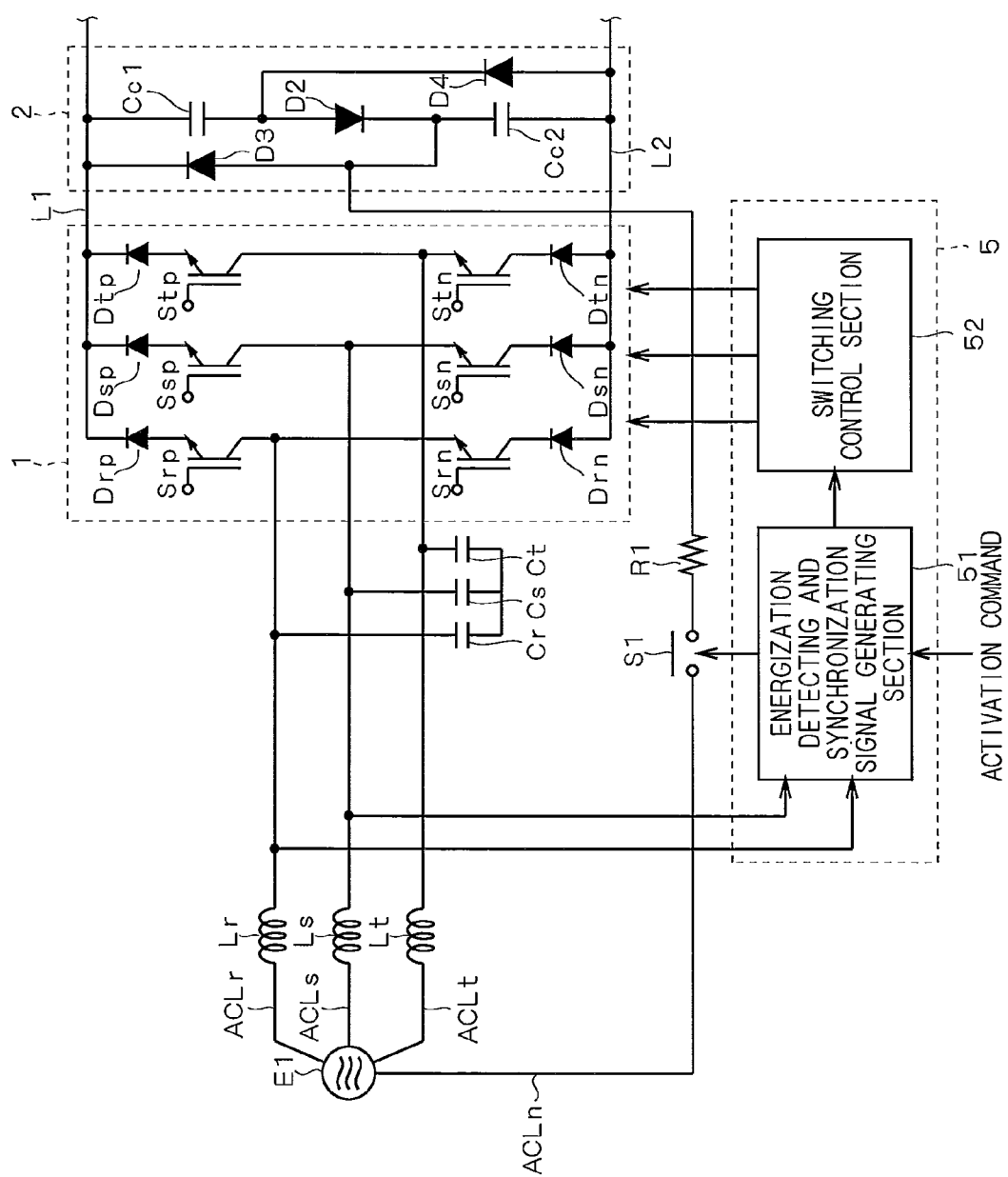

F I G . 1 1
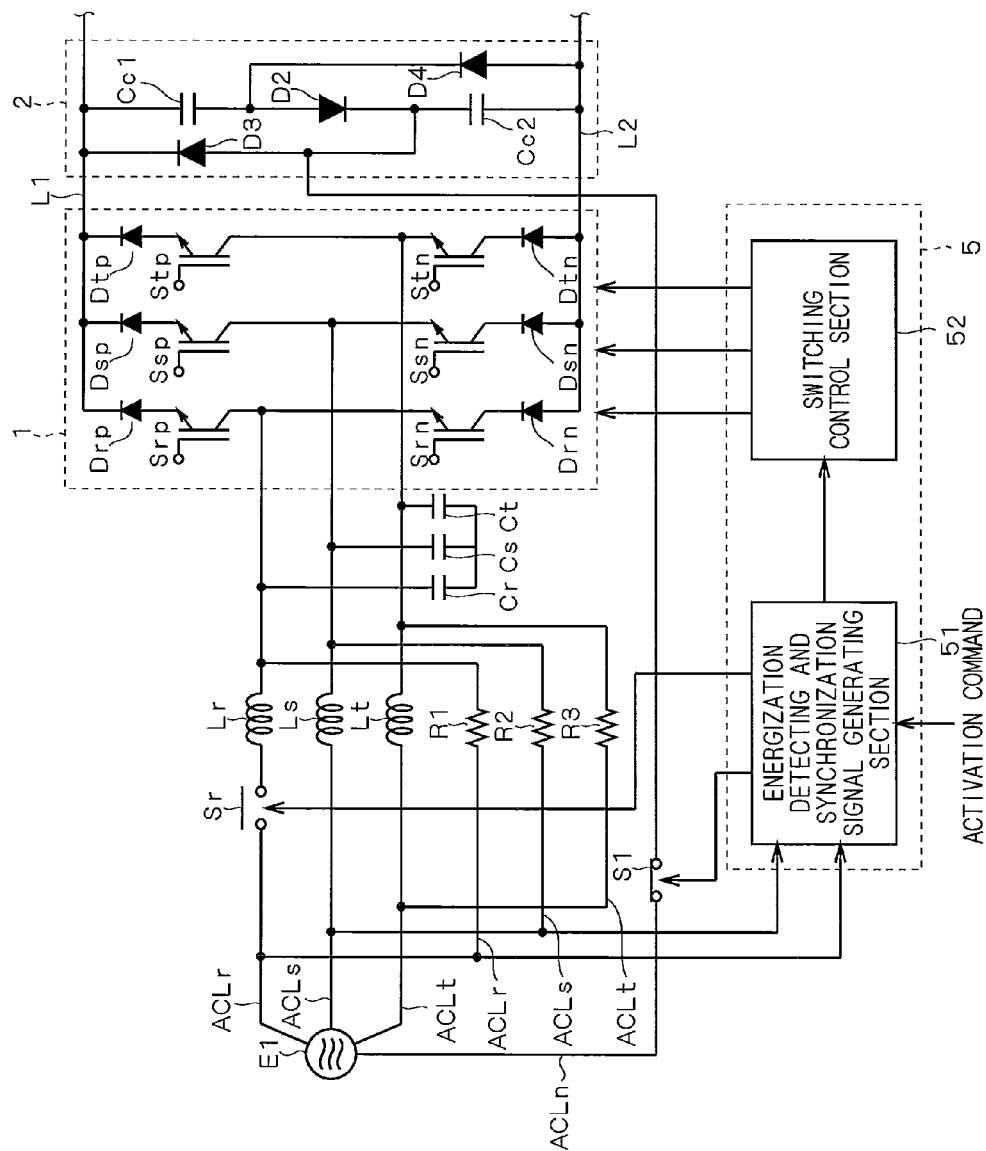

F I G . 1 4
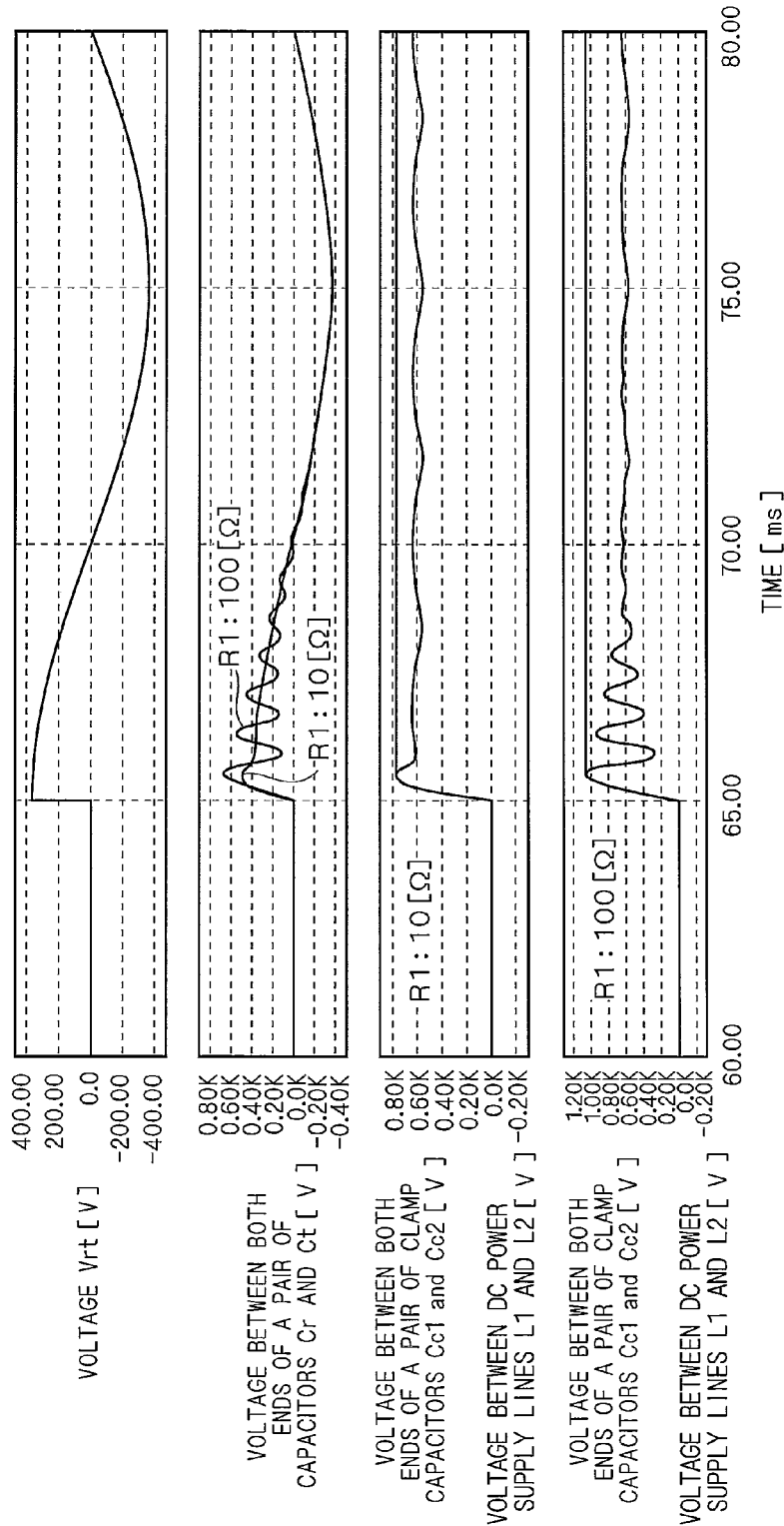

F I G . 1 9
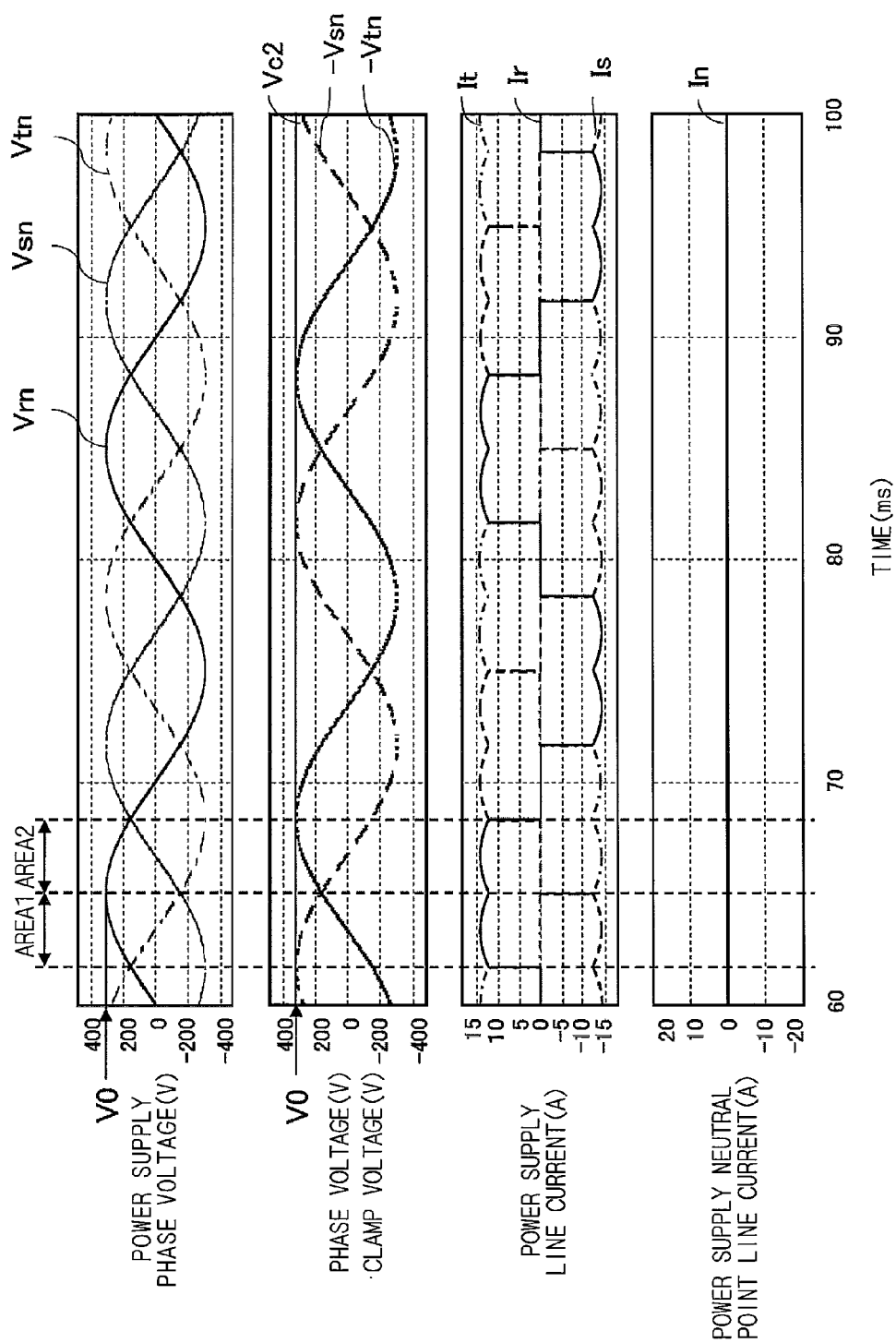

F I G . 2 3
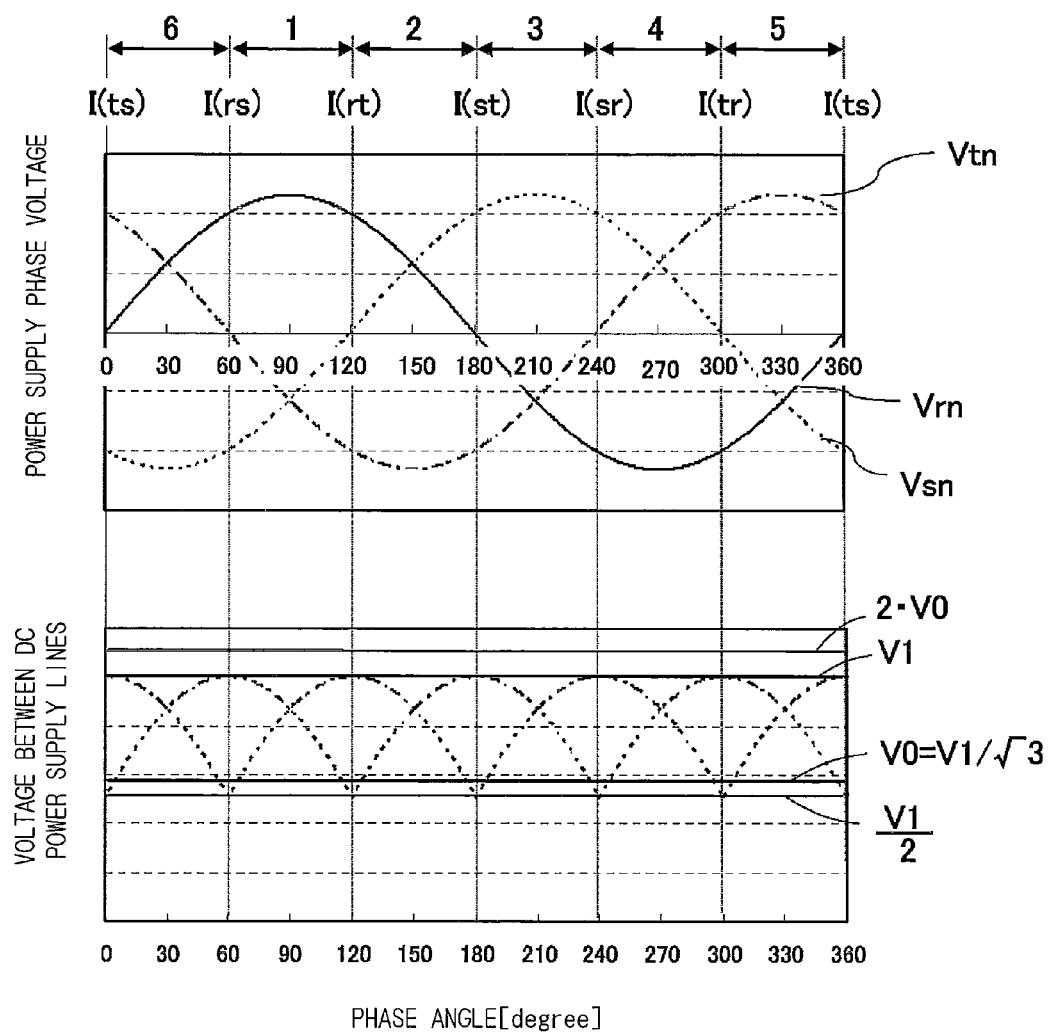

F I G . 2 5
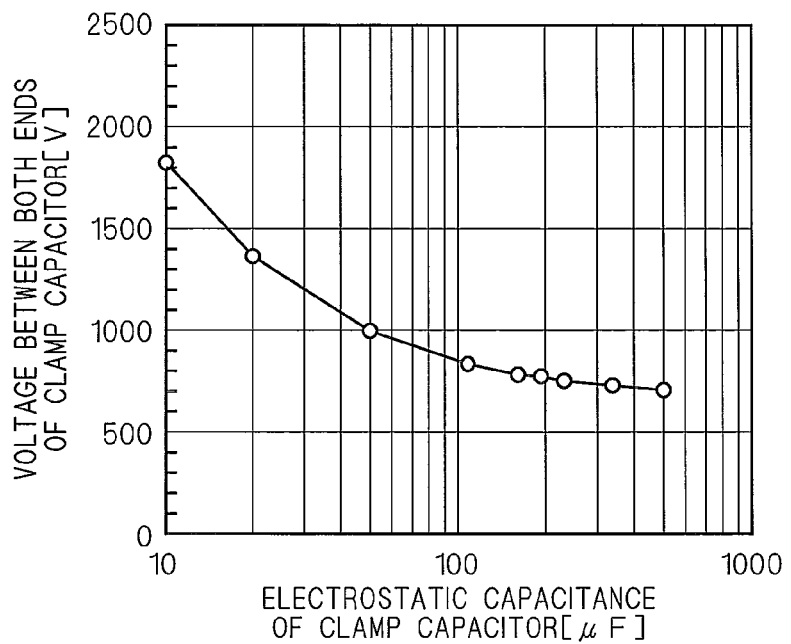
F I G . 2 6
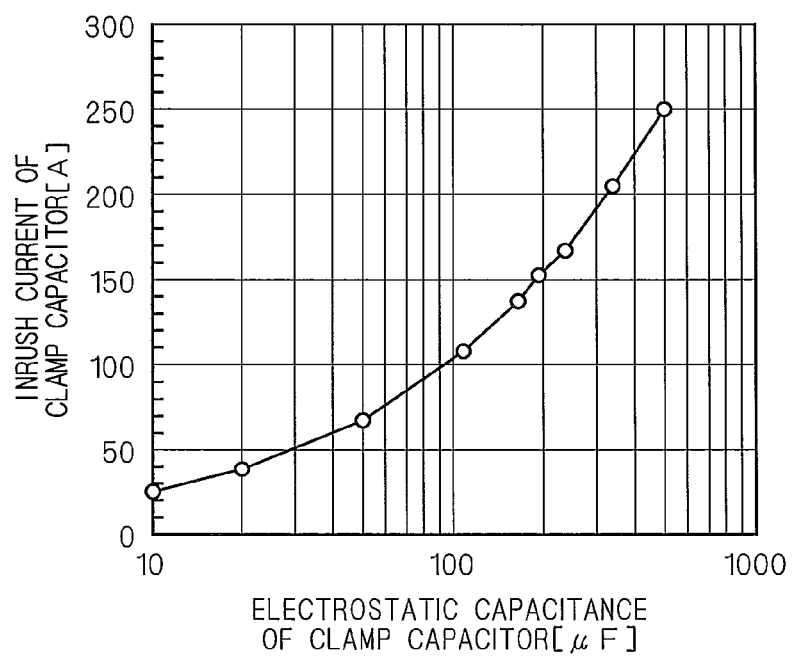

DIRECT AC POWER CONVERTING APPARATUS

TECHNICAL FIELD

The present invention relates to a direct AC power converting apparatus, and more particularly, to a technology of preventing inrush current to a capacitor included in a direct AC power converting apparatus.

BACKGROUND ART

Non-Patent Document 1, which will be described below, discloses a direct AC power converting apparatus including a clamp circuit. FIG. 24 shows the direct AC power converting apparatus described in Non-Patent Document 1. Note that for the sake of description of the present invention, reference symbols in the drawing do not necessarily correspond to those of Non-Patent Document 1.

It is assumed here that an IPM motor is provided on an output side of this direct AC power converting apparatus. When La represents an inductance per phase which corresponds to an average value of effective inductances of the IPM motor, i represents overload current which serves as a reference for interrupting current supply to the IPM motor, Vc represents voltage between both ends of a clamp capacitor, Cc represents electrostatic capacitance of the clamp capacitor, and Vs represents line voltage of a three-phase AC power supply, and when all power stored in an inductor for three phases of the IPM motor is regenerated to the clamp capacitor, the following relational expression is satisfied.

[Expression 1]
$$\frac{1}{2}La\left(i^2 + \left(\frac{i}{2}\right)^2 + \left(\frac{i}{2}\right)^2\right) = \frac{1}{2}Cc(Vc^2 - (\sqrt{2}\,Vs)^2) \quad (1)$$

Therefore, the voltage between both ends of the clamp capacitor is expressed by the following expression.

[Expression 2]
$$Vc = \sqrt{\frac{3}{2}\frac{La}{Cc}i^2 + 2Vs^2} \quad (2)$$

FIG. 25 is a graph showing the relationship between voltage between both ends and electrostatic capacitance of the clamp capacitor, which is based on Expression (2). For example, if the power supply voltage Vs is 400 V, the inductance La is 12 mH, the overload current i is 40 A, and the electrostatic capacitance of the clamp capacitor is 10 μF, the voltage Vc between both ends of the clamp capacitor is approximately 1,800 V. The power supply value exceeds device rating 1,200 V of a transistor and a diode with power supply voltage of 400 V class.

In order to keep the voltage Vc between both ends of the clamp capacitor at approximately 750 V or lower, the electrostatic capacitance of the clamp capacitor needs to be 200 μF or larger from Expression (2) and FIG. 25.

On the other hand, inrush current at power-on increases as the electrostatic capacitance of the clamp capacitor is increased. Here, a series circuit in which a power supply, a reactor, a resistor and a capacitor are connected in series is taken as an example of a series circuit for one phase, where L represents an inductance of the reactor, R represents a resistance value of the resistor, and C represents electrostatic capacitance of the clamp capacitor. Then, a transfer characteristic of output (current) to input (power supply voltage Vs) in the series circuit is expressed by the following expression.

[Expression 3]
$$G(s) = \frac{ic}{Vs} = sC\frac{1/LC}{s^2 + sR/L + 1/LC} \quad (3)$$

The response to step input is expressed by the following expression.

[Expression 4]
$$G(s) = sC\frac{1/LC}{s^2 + sR/L + 1/LC}\frac{1}{s} = \frac{1/L}{s^2 + sR/L + 1/LC} \quad (4)$$

Here, Expression (4) is subjected to inverse Laplace transform to obtain the response of current assuming that 1/L=D, R/L=E and 1/LC=F, then the following expression is derived.

[Expression 5]
$$i(t) = \frac{D}{\omega}e^{-\sigma t}\sin \omega t \quad (5)$$

[Expression 6]
$$\omega = \frac{\sqrt{4F - E^2}}{2}, \quad \sigma = \frac{E}{2} \quad (6)$$

F decreases as the electrostatic capacitance C of the capacitor increases, and D and E remain constant irrespective of the electrostatic capacitance C, and thus ω decreases as the electrostatic capacitance C of the capacitor increases. Accordingly, an amplitude term D/ω excluding attenuation through time increases as the electrostatic capacitance C of the capacitor increases. That is, inrush current increases along with an increase in electrostatic capacitance C of the capacitor.

When the maximum value of current is obtained assuming that a value obtained by differentiating i(t) with respect to time is 0 (i(t)'=0) from Expression (5), the following expression is derived.

[Expression 7]
$$t = \frac{\pi - \alpha}{\omega} \quad (7)$$

The current has the maximum value on this occasion. This maximum value is considered to be inrush current. FIG. 26 is a graph showing the relationship between inrush current (i((π−α)/ω)) and the electrostatic capacitance C.

As described above, the voltage between both ends of the clamp capacitor charged with the regenerative current is approximately equal to or lower than 750 V, and accordingly if the electrostatic capacitance of the clamp capacitor is 200 μF, the maximum value (inrush current) of current reaches 150 A from Expressions (6) and (7).

Patent Documents 1 to 4 disclose the technologies related to the present invention.

Non-Patent Document 1: Lixiang Wei and Thomas A. Lipo, "Investigation of 9-switch dual-bridge matrix converter operating under low output power factor", USA, IEEE, ISA 2003, vol. 1, pp. 176-181

Patent Document 1: U.S. Pat. No. 6,995,992

Patent Document 2: Japanese Patent Application Laid-Open No. 2006-54947

Patent Document 3: Japanese Patent Application Laid-Open No. 08-79963

Patent Document 4: Japanese Patent Application Laid-Open No. 02-65667

DISCLOSURE OF INVENTION

Problem to be Solved by the Invention

As described above, there is a problem that inrush current to the clamp capacitor increases as electrostatic capacitance of the clamp capacitor is increased for suppressing an increase in voltage between both ends of the clamp capacitor due to regenerative current.

An object of the present invention is therefore to provide a direct AC power converting apparatus capable of reducing inrush current while increasing electrostatic capacitance of a capacitor to prevent an increase in voltage between both ends of the capacitor.

Means to Solve the Problem

According to a first aspect of the present invention, a direct AC power converting apparatus includes: a plurality of input lines (ACLr, ACLs, ACLt) to which an output of a multi-phase AC power supply (E1) including a neutral point is applied; a positive-side DC power supply line (L1); a negative-side DC power supply line (L2) to which a potential lower than a potential applied to the positive-side DC power supply line is applied; a current-source power converter (1) including a plurality of switch devices, converting a multi-phase AC voltage applied between ones of the plurality of input lines into a square-wave-shape DC voltage having two potentials by selection operations of the plurality of switch devices, and supplying the DC voltage between the positive-side DC power supply line and the negative-side DC power supply line; a plurality of input capacitors (Cr, Cs, Ct) each provided between the ones of the plurality of input lines and functioning as a voltage source; a first diode (D1) provided between the positive-side DC power supply line and the negative-side DC power supply line and having an anode on the positive-side DC power supply line and a cathode on the negative-side DC power supply line side; first and second capacitors (Cc1, Cc2) connected, between the positive-side DC power supply line and the negative-side DC power supply line, in series with the first diode; a neutral phase input line (ACLn) connecting the neutral point and a point between the first capacitor and the second capacitor; a voltage-source power converter (3) converting the DC voltage into a square-wave-shape AC voltage and outputting to an inductive multi-phase load (4); a resistor (R1) inserted in any one of the plurality of input lines and the neutral phase input line; and a control section (5) controlling the selection operations of the plurality of switch devices, performing voltage doubler rectification on a phase voltage for one phase which is applied between one of the plurality of input lines and the neutral phase input line, and supplying for charging of the first capacitor and the second capacitor through the resistor.

According to a second aspect of the present invention, in the direct AC power converting apparatus according to the first aspect, the direct AC power converting apparatus further includes a second diode (D5) connected, between the positive-side DC power supply line (L1) and the negative-side DC power supply line (L2), in series with the first diode (D1), and having an anode on the positive-side DC power supply line (L1) side and a cathode on the negative-side DC power supply line (L2) side, wherein the neutral phase input line (ACLn) is connected between the first and second diodes.

According to a third aspect of the present invention, in the direct AC power converting apparatus according to the first or second aspect, the direct AC power converting apparatus further includes a switch (S1) provided on the neutral phase input line (ACLn), wherein the control section (5) supplies for charging of the first capacitor (Cc1) and the second capacitor (Cc2) in a state in which the switch is in conduction, and brings the switch into nonconduction after a lapse of a predetermined period of time.

According to a fourth aspect of the direct AC power converting apparatus of the present invention, in the direct AC power converting apparatus according to any one of the first to third aspects, the resistor (R1) is provided on the neutral phase input line (ACLn).

According to a fifth aspect of the present invention, in the direct AC power converting apparatus according to any one of the first to third aspects, the resistor (R1) is provided in one of the plurality of input lines (ACLr, ACLs, ACLt), the direct AC power converting apparatus further including reactors (Lr, Ls, Lt) connected in parallel with the resistor.

According to a sixth aspect of the direct AC power converting apparatus of the present invention, in the direct AC power converting apparatus according to any one of the first to fifth aspects, the first capacitor (Cc1) is provided on the positive-side DC power supply line (L1) side with respect to the second capacitor (Cc2), and the first diode (D2) is provided between the first capacitor and the second capacitor, the direct AC power converting apparatus further including: a third diode (D3) having an anode connected between the first diode and the second capacitor and a cathode connected to the positive-side DC power supply line; and a fourth diode (D4) having an anode connected to the negative-side DC power supply line and a cathode connected between the first diode and the first capacitor.

Effects of the Invention

According to the first aspect of the direct AC power converting apparatus of the present invention, the AC voltage for one phase is subjected to voltage doubler rectification to charge the first capacitor and the second capacitor, whereby it is possible to prevent the inrush current from flowing from the multi-phase AC power supply to the first capacitor and the second capacitor in an initial operation of the current-source power converter. Since the resistor is provided in a path of the charging, the inrush current does not flow in the charging as well. On this occasion, the input capacitor is not electrically connected to the first capacitor and the second capacitor. Therefore, the inrush current does not flow from the input capacitor to the first capacitor and the second capacitor even if the input capacitor is charged with voltage.

According to the second aspect of the direct AC power converting apparatus of the present invention, in the normal operation in which the current-source power converter converts a multi-phase AC voltage into a DC voltage having two potentials and the voltage-source power converter converts the DC voltage into a square-wave-shape AC voltage, it is possible to prevent the second capacitor from being charged/discharged through the neutral phase input line, which accordingly prevents a loss of symmetry of the input currents.

According to the third aspect of the direct AC power converting apparatus of the present invention, in the normal operation in which the current-source power converter converts a multi-phase AC voltage into a DC voltage having two potentials and the voltage-source power converter converts the DC voltage into a square-wave-shape AC voltage, connection of the power supply to the first capacitor and the second capacitor through the neutral phase input line is cut off. Accordingly, it is possible to prevent the second capacitor from being charged/discharged through the neutral phase input line, which accordingly prevents a loss of symmetry of the input currents.

Further, after the switch is brought into nonconductoin, the current-source power converter converts the multi-phase AC voltage applied between ones of the input lines into the DC voltage to supply to the first capacitor and the second capacitor, whereby the input capacitor is connected in parallel with the first capacitor and the second capacitor. The first capacitor and the second capacitor have been applied with the voltage subjected to voltage doubler rectification until then, and thus a voltage between both ends of a pair of the first capacitor and the second capacitor is larger than a voltage between both ends of the input capacitor. Accordingly, in a case where the input capacitor is connected in parallel with the first capacitor and the second capacitor, it is possible to effectively prevent the inrush current from flowing from the input capacitor to the first capacitor and the second capacitor.

According to the fourth aspect of the direct AC power converting apparatus of the present invention, the resistor is provided in the neutral phase input line, whereby it is possible to supply the DC current to the first capacitor and the second capacitor through the resistor by using any of the input lines.

According to the fifth aspect of the direct AC power converting apparatus of the present invention, it is possible to compose a carrier current component removing filter for removing a carrier current component by the reactor and the input capacitor. In addition, the resistor and the reactor are connected in parallel with each other, whereby it is possible to reduce pulsation of a voltage of the input capacitor in an initial charging period (transient period).

According to the sixth aspect of the direct AC power converting apparatus of the present invention, the first capacitor and the second capacitor are charged in the state of being connected in series with each other by the rectifying functions of the first, third and fourth diodes, and discharged in the state of being connected in parallel with each other. The first capacitor and the second capacitor are charged with a regenerative current from an inductive multi-phase load, and discharged when exceeding a voltage value which is determined based on the load power factor on the voltage-source power converting apparatus side. That is, it is possible to secure a discharging path by the first capacitor and the second capacitor, and accordingly there can be achieved an operation similar to an operation of a system described in Non-Patent Document 1, though it is a passive circuit.

Further, according to the direct AC power converting apparatus of the sixth aspect, which is according to the direct AC power converting apparatus of the third aspect according to the second aspect, in the normal operation in which the current-source power converter converts a multi-phase AC voltage into a DC voltage having two potentials, and the voltage-source power converter converts the DC voltage into a square-wave-shape AC voltage, the switch is in nonconduction. Accordingly, a voltage between the input lines is applied to a pair of the first capacitor and the second capacitor. Therefore, the voltage serving as a reference for discharging the first capacitor and the second capacitor in the state of being connected in parallel with each other becomes a half value, while it is $1/\sqrt{3}$ of the maximum value of the voltage between the input lines in the case where the switch is in the conductive state. Accordingly, the waveform of the input current can be improved.

These and other objects, features, aspects and advantages of the present invention will become more apparent from the following detailed description of the present invention when taken in conjunction with the accompanying drawings.

BRIEF DESCRIPTION OF DRAWINGS

FIG. 2 A flowchart showing an operation of a control section.

FIG. 3 A figure showing a voltage Vrn between an input line ACLr and a neutral phase input line ACLn, a conductive/nonconductive state of a transistor Srp, and a conductive/nonconductive state of a transistor Sm.

FIG. 4 A diagram showing a circuit for describing a mechanism for preventing inrush current.

FIG. 5 A block diagram of the circuit shown in FIG. 4.

FIG. 6 A figure showing a response of a current flowing through a capacitor shown in FIG. 4.

FIG. 7 A figure showing switching modes.

FIG. 9 A figure showing current vectors.

FIG. 10 A conceptual configuration diagram showing another example of the motor driving device according to the first embodiment FIG. 11 A conceptual configuration diagram showing a motor driving device according to a second embodiment.

FIG. 14 A figure showing a voltage between the input line ACLr and an input line ACLs, a voltage between both ends of a pair of capacitors Cr and Ct, a voltage between both ends of a pair of clamp capacitors Cc1 and Cc2, and a voltage between DC power supply lines L1 and L2.

FIG. 19 A graph showing the power supply phase voltages Vrn, Vsn and Vtn, the clamp voltage Vc2, the power supply lines Ir, Is and It, and the power supply neutral point line current In, which are obtained in a case where a normal operation is performed in the third embodiment.

FIG. 23 A graph showing the power supply phase voltages Vrn, Vsn and Vtn, and the voltage between the DC power supply lines L1 and L2, which are obtained in a case where a normal operation is performed in the direct AC power converting apparatus according to the third embodiment.

FIG. 25 A graph showing a relationship between electrostatic capacitance of a clamp capacitor and a voltage between both ends of the clamp capacitor.

FIG. 26 A graph showing a relationship between the electrostatic capacitance of the clamp capacitor and inrush current of the clamp capacitor.

BEST MODE FOR CARRYING OUT THE INVENTION

First Embodiment

Figure 1:
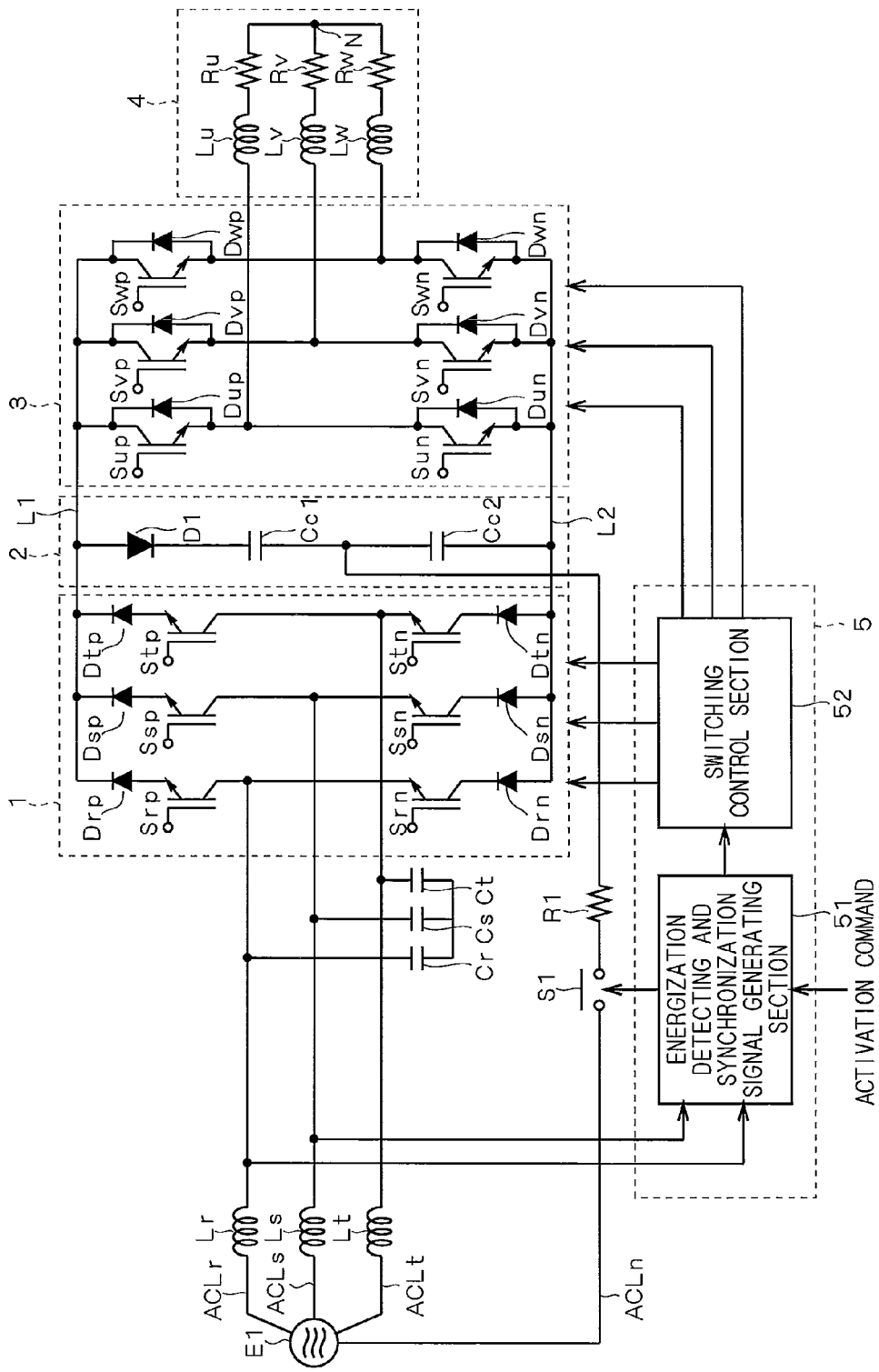
FIG. 1 conceptual configuration diagram showing an example of a motor driving device according to a first embodiment.

FIG. 1 shows a conceptual configuration of a motor driving device as an example of a direct AC power converting apparatus according to a first embodiment of the present invention. The motor driving device includes a power supply E1, input lines ACLr, ACLs and ACLt, a neutral phase input line ACLn, reactors Lr, Ls and Lt, capacitors Cr, Cs and Ct, a current-source converter 1, DC power supply lines L1 and L2, a clamp circuit 2, a voltage-source inverter 3, a motor 4, a control section 5, a resistor R1 and a switch S1.

The power supply E1 is a multi-phase AC power supply including a neutral point (not shown), which is, for example, a three-phase AC power supply. The input lines ACLr, ACLs and ACLt are supplied with an output of the power supply E1.

The reactors Lr, Ls and Lt are provided on the input lines ACLr, ACLs and ACLt, respectively.

Each of the capacitors Cr, Cs and Ct is connected between ones of the input lines ACLr, ACLs and ACLt through, for example, Y-connection. More specifically, the capacitors Cr and Cs are connected in series between the input lines ACLr and ACLs, the capacitors Cs and Ct are connected in series between the input lines ACLs and ACLt, and the capacitors Ct and Cr are connected in series between the input lines ACLt and ACLr. Those are provided on an input side of the current-source converter 1 and function as a voltage source. The capacitors Cr, Cs and Ct are considered to be input capacitors. On the other hand, the capacitors Cr, Cs and Ct are also considered to constitute, together with the reactors Lr, Ls and Lt, a carrier current component removing filter for removing a carrier current component, respectively.

The current-source converter 1 includes a plurality of switch devices, and converts a three-phase AC voltage applied to ones of the input lines ACLr, ACLs and ACLt into a square-wave-shape DC voltage having two potentials by selection operations of the plurality of switch devices, to thereby supply the DC voltage between the DC power supply lines L1 and L2. Note that the DC power supply line L1 is considered to be a positive-side DC power supply line, and that the DC power supply line L2 is considered to be a negative-side DC power supply line to which a potential lower than that of the DC power supply line L1 is applied.

More specifically, the current-source converter 1 includes transistors Srp, Srn, Ssp, Ssn, Stp and Stn, and diodes Drp, Drn, Dsp, Dsn, Dtp and Dtn.

Respective cathodes of the diodes Drp, Dsp and Dtp are connected to the DC power supply line L1. Respective anodes of the diodes Drn, Dsn and Dtn are connected to the DC power supply line L2.

Emitters of the transistors Srp, Ssp and Stp are connected to anodes of the diodes Drp, Dsp and Dtp, respectively. Collectors of the transistors Srn, Ssn and Stn are connected to cathodes of the diodes Drn, Dsn and Dtn, respectively. A collector of the transistor Srp and an emitter of the transistor Srn, a collector of the transistor Ssp and an emitter of the transistor Ssn, and a collector of the transistor Stp and an emitter of the transistor Stn are connected in common to the input lines ACLr, ACLs and ACLt, respectively.

Respective bases of those transistors Srp, Srn, Ssp, Ssn, Stp and Stn are supplied with a switch signal by the control section 5, and the current-source converter 1 converts the three-phase AC voltage into a square-wave-shape DC voltage having two potentials.

The clamp circuit 2 includes clamp capacitors Cc1 and Cc2 and a diode D1. The diode D1 is connected between the DC power supply lines L1 and L2, with an anode and a cathode thereof connected to the DC power supply line L1 side and the DC power supply line L2 side, respectively. The clamp capacitors Cc1 and Cc2 are both connected in series with the diode D1. The clamp capacitors Cc1 and Cc2 and the diode D1 are connected in series with each other. With the clamp circuit 2 as described above, it is possible to suppress a rise in voltage between the DC power supply lines L1 and L2, which arises from a reflux current flowing from the voltage-source inverter 3 toward the current-source converter 1. In addition, the clamp capacitors Cc1 and Cc2 divide the voltage between the DC power supply lines L1 and L2, and accordingly it is possible to reduce a voltage between both ends of each of the clamp capacitors Cc1 and Cc2.

The neutral phase input line ACLn connects the neutral point of the power supply E1 and a point between the clamp capacitors Cc1 and Cc2. The resistor R1 is inserted in the neutral phase input line ACLn. The switch S1 is provided in series with the resistor R1 on the neutral phase input line ACLn.

The voltage-source inverter 3 converts the square-wave-shape DC voltage between the DC power supply lines L1 and L2 into a square-wave-shape AC voltage and outputs the AC voltage to the motor 4. More specifically, the voltage-source inverter 3 includes transistors Sup, Sun, Svp, Svn, Swp and Swn, and diodes Dup, Dun, Dvp, Dvn, Dwp and Dwn.

Respective collectors of the transistors Sup, Svp and Swp and respective cathodes of the diodes Dup, Dvp and Dwp are connected to the DC power supply line L1, and respective emitters of the transistors Sun, Svn and Swn and respective anodes of the diodes Dun, Dvn and Dwn are connected to the DC power supply line L2.

An emitter of the transistor Sup, a collector of the transistor Sun, an anode of the diode Dup and a cathode of the diode Dun are connected in common to the motor 4, an emitter of the transistor Svp, a collector of the transistor Svn, an anode of the diode Dvp and a cathode of the diode Dvn are connected in common to the motor 4, and an emitter of the transistor Swp, a collector of the transistor Swn, an anode of the diode Dwp and a cathode of the diode Dwn are connected in common to the motor 4.

Bases of those transistors Sup, Sun, Svp, Svn, Swp and Swn are supplied with the switch signal by, for example, the control section 5, and the voltage-source inverter 3 converts the square-wave-shape DC voltage between the DC power supply lines L1 and L2 into a square-wave-shape AC voltage and outputs the AC voltage to the motor 4.

The motor 4 is, for example, a three-phase AC motor, and an inductance component and a resistance component thereof are represented by coils Lu, Lv and Lw, and resistors Ru, Rv and Rw which are connected in series therewith, respectively. Those series connections correspond to respective phases of the motor 4. One ends of those series connections are connected between the transistors Sup and Sun, between the transistors Svp and Svn, and between the transistors Swp and Swn, respectively. The other ends of those series connections are connected in common at a neutral point N.

The voltage-source inverter 3 supplies the square-wave-shape AC voltage. Thanks to the inductance component of the motor 4, an AC current for driving the motor 4 is smoothed. In other words, the motor 4 converts the square-wave-shape AC voltage supplied from the voltage-source inverter 3 into the AC current.

The capacitors Cr, Cs and Ct are charged with the AC current flowing through the motor 4 via the voltage-source inverter 3 and the current-source converter 1, which is converted into the AC voltage. In the other words, the motor 4 is also considered to be a current source for the current-source converter 1.

The control section 5 controls selection operations of the switch S1 and transistors of the current-source converter 1. The control section 5 controls the selection operation of the transistors of the current-source converter 1 in a sate where the switch S1 is in conduction, and performs voltage doubler rectification on a line current for one phase, which flows through one (for example, input line ACLr) of the input lines and the neutral phase input line ACLn via the resistor R1 to supply it to the clamp capacitors Cc1 and Cc2, to thereby bring the switch S1 into nonconduction after a lapse of a given period of time.

More specifically, the control section 5 includes an energization detecting and synchronization signal generating section 51 and a switching control section 52.

The energization detecting and synchronization signal generating section 51 detects the AC currents flowing through, for example, given two phases (for example, input lines ACLr and ACLs) of the power supply E1 to generate a synchronization signal, and supplies the synchronization signal to the switching control section 52. In addition, the energization detecting and synchronization signal generating section 51 supplies a switch signal to the switch S1.

The switching control section 52 supplies switching signals to the transistors of the current-source converter 1 in synchronization with the input synchronization signal.

An operation of the control section 5 in the motor driving device having the configuration as described above will be described. FIG. 2 is a flowchart showing the operation of the control section 5.

First, in Step ST1, the energization detecting and synchronization signal generating section 51 receives an activation command from, for example, an external CPU etc. Then, in Step ST2, the energization detecting and synchronization signal generating section 51 which has received the activation command detects the AC currents flowing through, for example, the given two phases (for example, input lines ACLr and ACLs) of the power supply E1, and generates a synchronization signal based on a period of the AC currents, to thereby supply the synchronization signal to the switching control section 52. Accordingly, the energization detecting and synchronization signal generating section 51 and the switching control section 52 are respectively capable of outputting switch signals in synchronization with each other.

Next, in Step ST3, the energization detecting and synchronization signal generating section 51 sends the switch signal to the switch 51 to bring the switch S1 into conduction.

Then, in Step ST4, in synchronization with the received synchronization signal, the switching control section 52 performs voltage doubler rectification on a phase voltage for one phase between one (for example, input line ACLr) of the input lines and the neutral phase input line ACLn for charging of the clamp capacitors Cc1 and Cc2. Specifically, the switching control section 52 starts, for example, the control of the transistors Srp and Srn. FIG. 3 is a figure showing a voltage Vrn between the input line ACLr and the neutral phase input line ACLn, conductive/nonconductive states of the transistors Srp and Srn. Note that in FIG. 3 the voltage Vrn is positive when the voltage Vrn has high potential on the input line ACLr side.

As shown in FIG. 3, the switching control section 52 brings the transistor Srp into conduction in a half period in which the voltage Vrn has high potential on the input line ACLr side, and brings the transistor Srn into conduction in the other half period. The clamp capacitor Cc1 is charged in a state where the transistor Srp is in conduction, whereas the clamp capacitor Cc2 is charged in a state where the transistor Srn is in conduction. In this case, the resistor R1 is inserted in both charging paths of the clamp capacitors Cc1 and Cc2, whereby the DC voltage is applied to the clamp capacitors Cc1 and Cc2 through the resistor R1. Therefore, it is possible to prevent the inrush current from flowing from the power supply E1 to the clamp capacitors Cc1 and Cc2.

The following description is given of a reason why the inrush current can be prevented by current flowing through the clamp capacitors Cc1 and Cc2 via the resistor R1. For the sake of simplicity, description is given of a current i flowing through the circuit in a case where a power supply voltage Vs (corresponding to the voltage between the input line ACLr and the neutral phase input line ACLn) is applied in series to the circuit including a reactor L (corresponding to the reactor Lr), a resistor R (corresponding to the resistor R1), and a capacitor C (corresponding to the clamp capacitors Cc1 and Cc2) which are connected in series with each other.

FIG. 4 is a diagram showing this circuit, and FIG. 5 is a block diagram in which a current ic flowing through the capacitor C when the power supply voltage Vs is input is assumed to be an output. A transfer characteristic G(s) of the current ic to the power supply voltage Vs is similar to Expression (1). When a response to a step input is determined, Expression (2) is derived. Here, a resistance value R of the resistor R1 is large, and a transient response (within a range of small s) is taken into account, whereby the following expression is derived if the transfer characteristic is approximated with time-lag of first order.

[Expression 8]

$$G(s) = \frac{D}{sE+F} = \frac{D/E}{s+F/E} \tag{8}$$

This is subjected to inverse Laplace transform, whereby the following expression is derived.

[Expression 9]

$$ic(t) = \frac{D}{E}e^{-F/Et} \quad (9)$$

Here, D=1/L, E=R/L, and F=1/LC.

FIG. 6 represents Expression (9) graphically, which shows the relationship between the current flowing through the capacitor and time. Note that FIG. 6 shows the results obtained in a case where an inductance of the reactor L is 1 mH, an electrostatic capacitance of the capacitor C is 330 µF, a resistance value of the resistor R is 10Ω, and the power supply voltage Vs is 400 V. The maximum value of the current is obtained by substituting t=0 into Expression (9), and ic(0)=1/R (constant). This is considered to be inrush current, and the inrush current has a value expressed only by the resistance value R. Therefore, it is possible to restrict the inrush current.

Referring to FIG. 2 again, in Step ST5, the energization detecting and synchronization signal generating section 51 determines whether or not a predetermined period of time has passed from the start of Step ST4, and executes Step ST5 again if it has not passed. If it has passed, in Step ST6, the energization detecting and synchronization signal generating section 51 brings the switch 51 into nonconduction. Since the switch S1 is in nonconduction, the AC current from the power supply E1 does not flow through the resistor R1. Accordingly, it is possible to prevent the generation of loss produced in the resistor R1 after restricting the inrush current.

Further, in Step ST4, the clamp capacitors Cc1 and Cc2 are supplied with the phase voltage for one phase between, for example, the input line ACLr and the neutral phase input line ACLn, and thus the capacitors Cr, Cs and Ct are not connected to the clamp capacitors Cc1 and Cc2. Accordingly, it is possible to prevent the inrush current from flowing from the capacitors Cr, Cs and Ct to the clamp capacitors even if the capacitors Cr, Cs and Ct are charged.

Next, in Step ST7, the direct AC power converting apparatus is activated, to thereby shift to a normal operation. More specifically, in order to switch the switching operation of the current-source converter 1 to a normal operation, the current-source converter 1 is activated again, and the voltage-source inverter 3 is also activated. In the normal operation, the switching control section 52 supplies switch signals to the transistors Srp, Srn, Ssp, Ssn, Stp and Stn to operate the current-source converter 1, thereby converting the AC voltage input from the input lines ACLr, ACLs and ACLt into a square-wave-shape DC voltage having two potentials to supply the DC voltage to the DC power supply lines L1 and L2. Then, the voltage-source inverter 3 operates, for example, in synchronization with the current-source converter 1, and converts the square-wave-shape DC voltage between the DC power supply lines L1 and L2 into a square-wave-shape AC voltage to apply the AC voltage to the motor 4.

The clamp capacitors Cc1 and Cc2 are applied with the DC voltage subjected to voltage doubler rectification in Step ST4, and thus a voltage between both ends of a pair of the clamp capacitors Cc1 and Cc2 is higher than, for example, a voltage between both ends of a pair of the capacitors Cr and Cs (specifically, 2/√3 times). Accordingly, it is possible to, in starting the normal operation, effectively prevent the current initially flowing from the capacitors Cr and Cs to the clamp capacitors Cc1 and Cc2 from flowing as the inrush current.

As described above, according to this motor driving apparatus, it is possible to prevent inrush current from flowing from the power supply E1 to the clamp capacitors Cc1 and Cc2. Moreover, it is possible to, in starting the normal operation, effectively prevent inrush current from flowing from the capacitors Cr, Cs and Ct to the clamp capacitors Cc1 and Cc2.

Note that a current-source converter is not typically provided with a current limiting resistor because a reactor is typically provided for output of a current-source converter. However, in a case where AC voltage is converted into square-wave-shape voltage having two potentials and there are provided the clamp capacitors Cc1 and Cc2 which function as capacitors as described above, it is desired to provide a current limiting resistor for preventing charging current which initially flows from flowing to those as inrush current.

Note that in Step ST4, the switching control section 52 brings the transistor Srp into conduction in a half period in which the voltage Vrn has high potential on the input line ACLr side and brings the transistor Srn into conduction in the other half period, which is not limited thereto. For example, there may be used a switching operation waveform of the current-source converter 1 for one phase in the normal operation.

Figure 8:
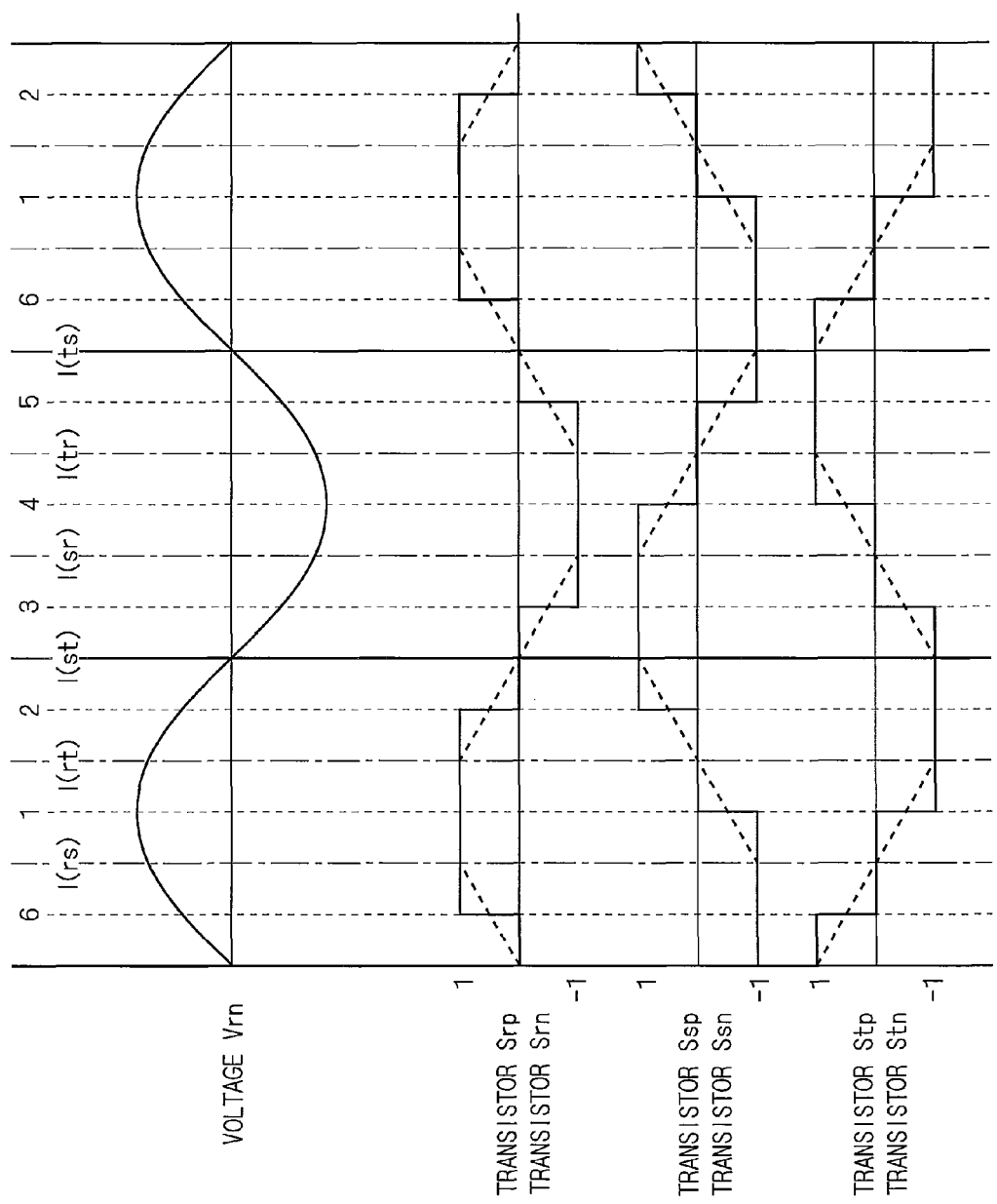
FIG. 8 A figure showing the voltage Vrn between the input line ACLr and the neutral phase input line ACLn, conductive/nonconductive states of the transistors Srp and Sm, transistors Ssp, Ssn, Stp and Stn.

FIGS. 7 to 9 are figures for describing the switching operation of the current-source converter 1 in the normal operation. In the normal operation, the switching control section 52 outputs switch signals to the current-source converter 1 so that six switching modes are selected in succession as shown in, for example, FIG. 7. Note that in FIG. 7, "1" and "0" represent a state in which the transistor is in conduction and a state in which the transistor is in nonconduction, respectively, and that I(P) (P is any of rs, rt, st, sr, tr and ts) represents a current vector output from the current-source converter 1 in accordance with the switching mode.

FIG. 8 shows the voltage Vrn between the input line ACLr and the neutral phase input line ACLn, and conduction/nonconduction states of the transistors Srp, Srn, Ssp, Ssn, Stp and Stn. Note that the conduction/nonconduction in the normal operation is indicated by a broken line, and the conductive states of the transistors Srn, Ssn and Stn are represented by "−1". In addition, for example, the transistors are shifted linearly from the 0 (nonconduction) state to the 1 or −1 (conduction) state. If, for example, a pulse width of a switch signal supplied to a transistor is controlled, the switch operation as described above can be substantially achieved.

The current vector output from the current-source converter 1 describes a locus of a hexagon with respective current vectors I(P) being as vertices by the switching operation shown in FIG. 8, as shown in, for example, FIG. 9. Through the switching operation as described above, in the normal operation, the switching control section 52 outputs switch signals to the transistors Srp, Ssp, Stp, Srn, Ssn and Stn, and converts a three-phase AC voltage input from the input lines ACLr, ACLs and ACLt into a square-wave-shape DC voltage having two potentials to supply the DC voltage to the DC power supply lines L1 and L2.

This operation in a normal operation is applied to the operation in Step ST4. More specifically, in Step ST4, the switching control section 52 controls the selection operations of the transistors Srp and Srn as, for example, indicated by a solid line in FIG. 8. This is achieved by outputting switch signals to the transistors Srp and Srn so that the nearest current vector is output within a phase angle (ωt) of each mode shown in FIG. 9. Note that the selection operation of the transistors Ssp and Ssn may be controlled.

Even in this case, the resistor R1 is arranged in the case where the clamp capacitors Cc1 and Cc2 are charged using the phase voltage for one phase between the input line ACLr and the neutral phase input line ACLn, which prevents the inrush current from flowing from the power supply E1 to the clamp capacitors Cc1 and Cc2. In addition, the voltage doubler rectification is performed for charging the clamp capacitors Cc1 and Cc2, which also prevents the inrush current from flowing from the capacitors Cr, Cs and Ct to the clamp capacitors Cc1 and Cc2 in starting the normal operation.

Further, the switching operation in the normal operation is applicable, whereby there is no need to generate a waveform dedicated to charging contrary to, for example, the case shown in FIG. 3.

Further, the switching operation of the current-source converter 1 in Step ST4 and the switching operation of the current-source converter 1 in the normal operation can be switched without activating the current-source converter 1 again, whereby it is not necessarily required to activate the current-source converter 1 again in Step ST7.

FIG. 10 shows a conceptual configuration of the motor driving device as the other example of the direct AC power converting apparatus according to the first embodiment. The motor driving device shown in FIG. 10 is the same as the motor driving device shown in FIG. 1 except for the clamp circuit 2. Note that in FIG. 10, circuits at the stages subsequent to the clamp circuit 2 are omitted.

The clamp circuit 2 includes the clamp capacitors Cc1 and Cc2 and diodes D2 to D4. The clamp capacitor Cc1 is connected between the DC power supply lines L1 and L2. The clamp capacitor Cc2 is connected in series with the clamp capacitor Cc1 and is provided on the DC power supply line L2 side with respect to the clamp capacitor Cc1.

The diode D2 is connected between the clamp capacitors Cc1 and Cc2, with its anode connected to the clamp capacitor Cc1 and its cathode connected to the clamp capacitor Cc2. The diode D3 has an anode connected between the clamp capacitor Cc2 and the diode D2 and a cathode connected to the DC power supply line L1. The diode D4 has an anode connected to the DC power supply line L2 and a cathode connected between the clamp capacitor Cc1 and the diode D2.

With the clamp circuit 2 as described above, in a case where a current flowing through the motor 4 delays with respect to a voltage between the DC power supply lines L1 and L2 due to a power load factor on the voltage-source inverter 3 side, a reflux current flows from the motor 4 to the DC power supply lines L1 and L2 in a given period, with the result that the clamp capacitors Cc1 and Cc2 are charged in a state of being connected in series with each other. A charging voltage (voltage between both ends of a pair of the clamp capacitors Cc1 and Cc2) on this occasion is determined based on the load power factor as well. On the other hand, the clamp capacitors Cc1 and Cc2 are discharged in a state of being connected in parallel with each other when respective voltages between both ends of the clamp capacitors Cc1 and Cc2 rise higher than a voltage which is lower one of the square-wave-shape DC voltages between the DC power supply lines L1 and L2. Note that the clamp capacitors Cc1 and Cc2 are charged in the state of being connected in series with each other and discharged in the state of being connected in parallel with each other, and accordingly a discharging voltage is a half of the charging voltage.

Through the charging/discharging operation as described above, the voltages of the clamp capacitors Cc1 and Cc2 are balanced in a case where the discharging current is larger than the charging current.

As described above, the reflux current from the motor 4 is charged and is discharged to be supplied to the motor 4 again, with the result that the motor 4 is driven with efficiency. In addition, the clamp circuit 2 does not require a so-called active device such as a switch device, whereby power consumption and manufacturing cost are reduced.

Second Embodiment

FIG. 11 shows a conceptual configuration of a motor driving device as an example of a direct AC power converting apparatus according to a second embodiment. The conceptual configuration of this motor driving device is the same as the motor driving device shown in FIG. 10 except for resistors R1 to R3 and an auxiliary switch Sr. Note that in FIG. 11, circuits at stages subsequent to the clamp circuit 2 are omitted. In addition, the clamp circuit 2 may be one shown in FIG. 1.

The resistors R1 to R3 are inserted in the input lines ACLr, ACLs and ACLt, respectively. The auxiliary switch Sr is connected in series with any of the reactors Lr to Lt, and is connected in series with the reactor Lr in FIG. 9. The reactors Ls and Lt are connected in parallel with the resistors R2 and R3, respectively. A pair of the auxiliary switch Sr and the reactor Lr are connected in parallel with the resistor R1.

The energization detecting and synchronization signal generating section 51 is capable of controlling a selection operation of the auxiliary switch Sr.

The operation of the control section 5 in the above-mentioned motor driving device is the same as that of the flowchart shown in FIG. 2 except for Step ST6. In Step ST6, the energization detecting and synchronization signal generating section 51 brings the switch S1 into nonconduction and the auxiliary switch Sr into conduction. Note that in Step ST4, the switching control section 52 desirably outputs switch signals to the current-source converter 1 as shown in FIG. 3 or as indicated by the solid line of FIG. 8.

Note that the switch S1 is brought into conduction in Step ST3, and the auxiliary switch Sr is in nonconduction at a time when the current-source converter 1 is controlled in Step ST4, whereby the AC currents flowing through the input line ACLr and the neutral phase input line ACLn inevitably flow through the resistor R1. Therefore, it is possible to effectively prevent the inrush current from flowing into the clamp capacitors Cc1 and Cc2. Note that, without providing the auxiliary switch Sr, part of the AC currents flowing through the input line ACLr and the neutral phase input line ACLn may flow into the clamp capacitors Cc1 and Cc2 through the reactor Lr. Even in this case, other part of the AC current flows through the resistor R1, whereby the inrush current can be reduced. In addition, as to the AC current flowing through the reactor Lr, it is possible to reduce the inrush current thanks to, for example, a resistance component of the reactor Lr.

Further, in the carrier current component removing filters composed of the reactors Lr, Ls and Lt and the capacitors Cr, Cs and Ct, respectively, the resistors R1 to R3 are capable of improving input/output transient characteristics of the capacitors Cr, Cs and Ct. This will be described below in detail.

Figure 12:
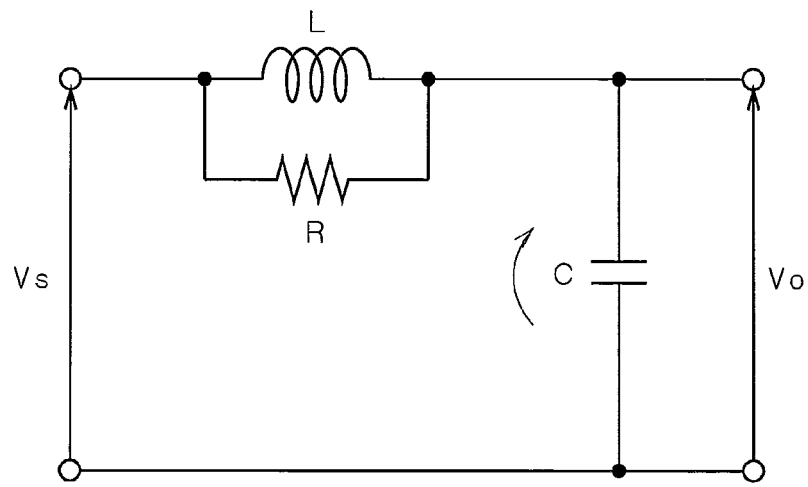
FIG. 12 A diagram showing a circuit for describing a mechanism for improving input characteristics to a capacitor.

For the sake of simplicity, description is given of a case where the power supply voltage Vs is input to a circuit in which the capacitor C (corresponding to the capacitors Cr, Cs and Ct) is connected in series with a pair of the reactor L (corresponding to the reactors Lr, Ls and Lt) and the resistor R (corresponding to the resistors R1 to R3) which are connected in parallel with each other. FIG. 12 is a configuration diagram showing this circuit. In this circuit, a voltage V0 between both ends of the capacitor C is considered to be an output in inputting the power supply voltage Vs. A transfer function of the voltage V0 between both ends to the power supply voltage Vs is as follows.

[Expression 10]

$$G(s) = \frac{Vc}{Vs} = (sL/R + 1)\frac{1/LC}{s^2 + s/CR + 1/LC} \quad (10)$$

In this transfer function, undamped natural frequencies f1 and f2 and a damping coefficient ξ are represented by the following expression.

[Expression 11]

$$f_1 = \frac{1}{2\pi L/R}, f_2 = \frac{1}{2\pi\sqrt{LC}}, \xi = \frac{1}{2R}\sqrt{\frac{L}{C}} \quad (11)$$

Figure 13:
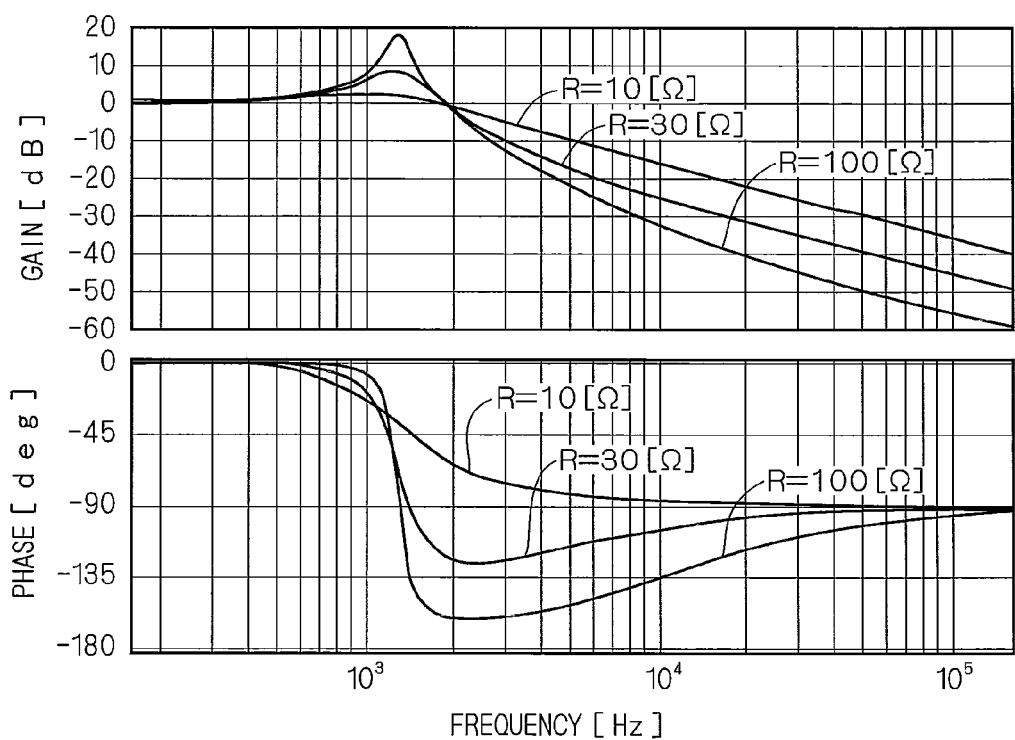
FIG. 13 A Bode diagram of the circuit shown in FIG. 12.

FIG. 13 is a Bode diagram showing frequency characteristics of the transfer function. FIG. 14 shows the results which are obtained in three cases where a resistance value of the resistor R is 10Ω, 30Ω and 100Ω, where an inductance of the reactor L is 1.5 mH and an electrostatic capacitance of the capacitor C is 10 μF.

FIG. 14 shows a voltage Vrt, a voltage between both ends of a pair of the capacitors Cr and Ct, a voltage between both ends of a pair of the clamp capacitors Cc1 and Cc2, and a voltage between the DC power supply lines L1 and L2 in the motor driving device of FIG. 11 using the carrier current component removing filter as described above. Note that FIG. 14 shows the results when the resistance value of the resistor R1 is 10Ω and 100Ω.

As shown in FIG. 14, damping is produced by the resistance value of the resistor R1, whereby it is possible to reduce voltages (transient voltages) applied to the capacitors Cr and Ct and the clamp capacitors Cc1 and Cc2 in the transient period (see the results of 10Ω-resistance value and 100Ω-resistance value).

Compared with the inrush current shown in FIG. 6, it is possible to reduce the inrush current and also reduce the transient voltages of the capacitors Cr, Cs and Ct if the resistance value is approximately 10Ω.

Third Embodiment

When the direct AC power converting apparatus described in the first embodiment is shifted to the normal operation while the switch S1 is held in conduction due to, for example, a malfunction of the switch S1 or control, the power supply line currents flowing through the input lines ACLr, ACLs and ACLt become asymmetrical, which may cause current distortion or overcurrent. First, this problem will be described in detail with reference to the direct AC power converting apparatus shown in FIG. 1.

In the first embodiment, the description has been given assuming that the switching operation indicated by the broken line shown in FIG. 8 is performed in the transistors Srp, Srn, Ssp, Ssn, Stp and Stn in the normal operation. Here, description is given assuming that for simplicity of description, the switching operation indicated by the solid line shown in FIG. 8 is performed in the normal operation.

Figure 15:
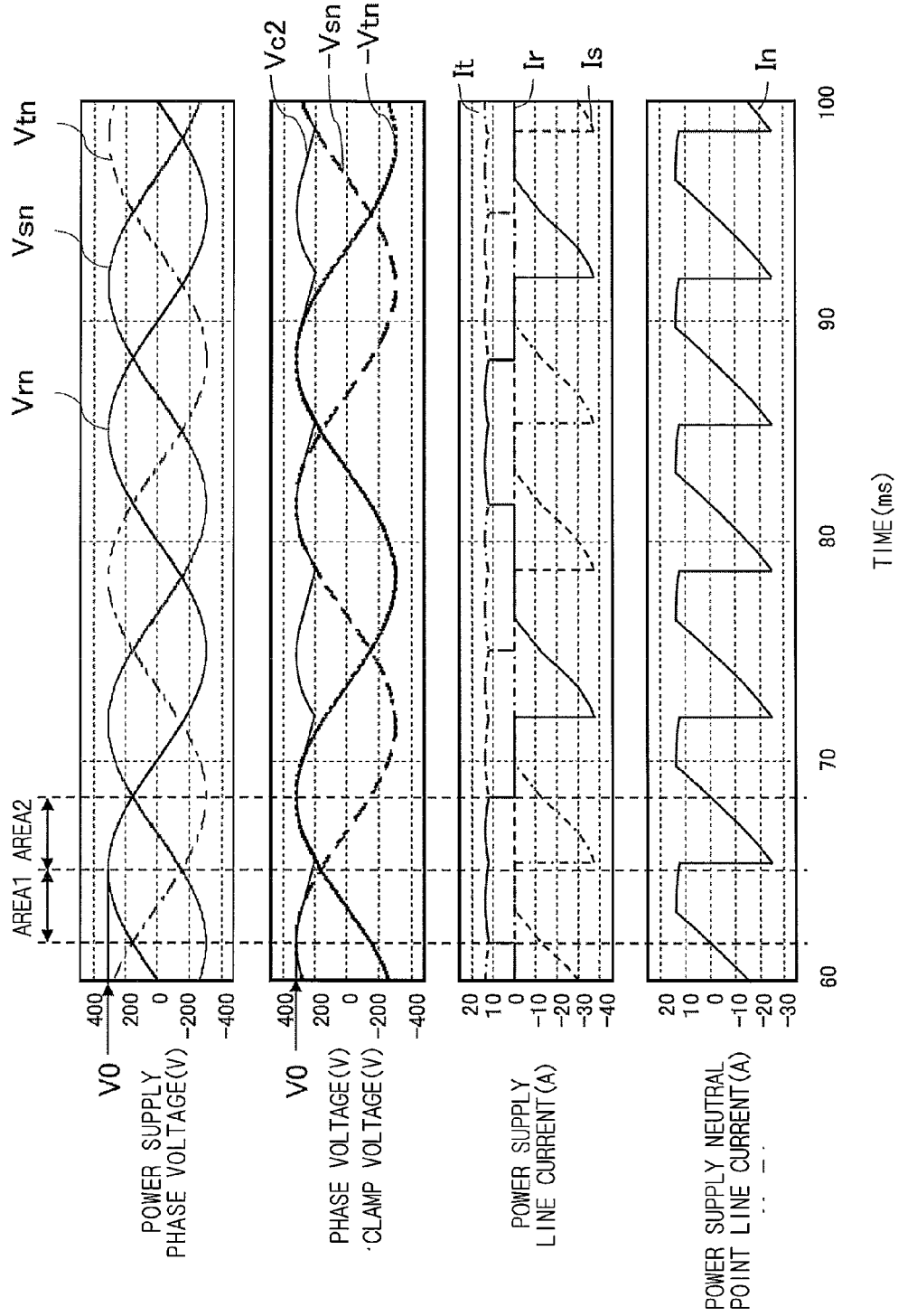
FIG. 15 A graph showing power supply phase voltages Vrn, Vsn and Vtn, a clamp voltage Vc2, power supply line currents Ir, Is and It, and a power supply neutral point line current In, which are obtained in a case where a normal operation is performed while a switch S1 is held in conduction in the first embodiment.

FIG. 15 shows power supply phase voltages Vrn, Vsn and Vtn, a voltage Vc2 between both ends of the clamp capacitor Cc2, power supply line currents Ir, Is and It, and a power supply neutral point line current In, which are obtained in a case where the normal operation is performed in a state in which the switch S1 is in conduction. Note that the power supply phase voltages Vrn, Vsn and Vtn have potentials of the input lines ACLr, ACLs and ACLt with the potential of the neutral phase input line ACLn being as a reference, respectively. The power supply line currents Ir, Is and It are currents flowing through the input lines ACLr, ACLs and ACLt, respectively, where a direction of the current flowing from the power supply E1 to the current-source converter 1 is considered to be positive. The power supply neutral point line current In is a current flowing through the neutral phase input line ACLn, where a direction of the current flowing from the current-source converter 1 to the power supply E1 is considered to be positive.

Figure 16:
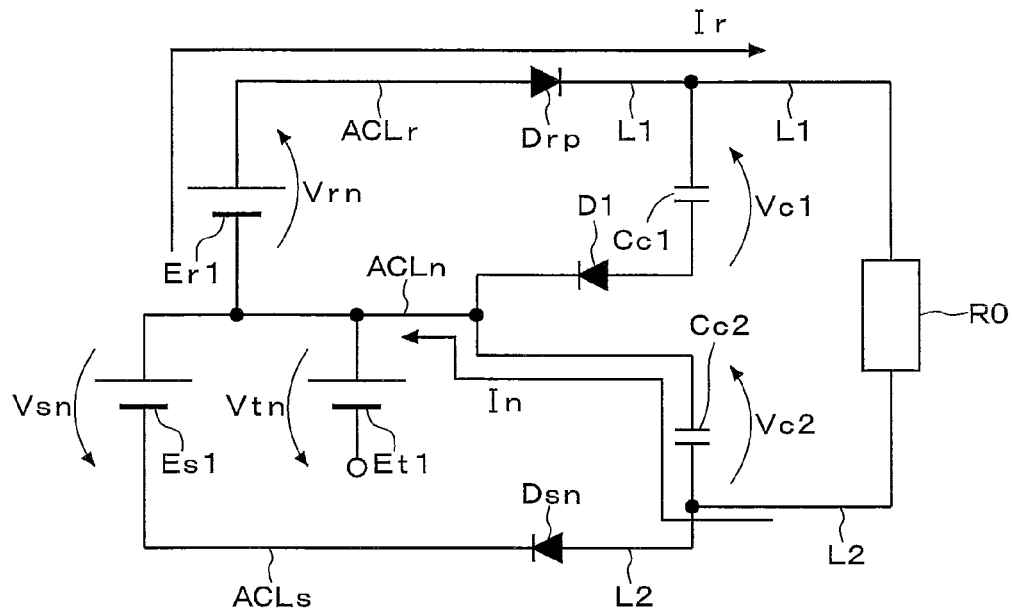
FIG. 16 A diagram showing an equivalent circuit of a direct AC power converting apparatus according to the first embodiment in an area 1.

In an area 1 shown in FIG. 15, the transistors Srp and Ssn are in conduction (see also FIG. 8). FIG. 16 shows an equivalent circuit of the direct AC power converting apparatus in the area 1. Note that in FIG. 16, a pair of the voltage-source inverter 3 and the motor 4 are shown as a load R0, and the power supply E1 is shown as single-phase power supplies Er1, Es1 and Et1 which are star-connected. Further, for the sake of simplicity, the current limiting resistor R1 is neglected.

Through the operations of Steps ST1 to ST5 described in the first embodiment, the clamp capacitors Cc1 and Cc2 are charged with the maximum value V0 of the power supply phase voltages Vrn, Vsn and Vtn.

The transistors Srp and Ssn are brought into conduction in the area 1, whereby a voltage Vrs (=Vrn−Vsn, which is hereinafter referred to as a line voltage Vrs) between the input lines ACLr and ACLs is applied between the DC power supply lines L1 and L2. Accordingly, the current flows from the single-phase power supply Er1 to the load R0 through the transistor Srp. In FIG. 16, this is indicated by a power supply line current Ir flowing through the input line ACLr.

On this occasion, the clamp capacitor Cc1 is not charged/discharged. The reason for this will be described below. The diode D1 impedes discharging of the clamp capacitor Cc1, and thus a discharging current does not flow from the clamp capacitor Cc1. As a result, a voltage Vc1 between both ends of the clamp capacitor Cc1 (hereinafter, referred to as clamp voltage Vc1) is held at the maximum value V0 of the power supply phase voltage. Accordingly, the clamp voltage Vc1 does not become smaller than the power supply phase voltage Vrn, whereby the charging current does not flow from the DC power supply line L1 to the clamp capacitor Cc1.

On the other hand, the clamp capacitor Cc2 is discharged. The reason for this will be described below. In the area 1, the current which has flowed from the input line ACLr to the load R0 initially flows through the input line ACLs as it is. On this occasion, the clamp capacitor Cc1 and the single-phase power supply Er1 are connected in parallel with each other, and thus the clamp capacitor Cc2 is discharged along with a decrease in absolute value of the power supply phase voltage Vsn of the single-phase power supply Es1. The clamp capacitor Cc2 is discharged through the neutral phase input line ACLn. This is indicated by the power supply neutral point line current In flowing through the neutral phase input line ACLn in FIGS. 15 and 16.

In the area 1, an absolute value of the power supply line current Ir is equal to a sum of an absolute value of the power supply line current Is and an absolute value of the power supply neutral point line current In. In addition, the power supply line current Ir has a value determined by the load R0 and the line voltage Vrs, and accordingly, the power supply line current Is decreases as the absolute value of the power supply neutral point line current In increases.

A rate of change of the absolute value of the power supply phase voltage Vsn increases along with a lapse of time, whereby a rate of drop of the clamp voltage Vc2 also increases along with a lapse of time as well. Therefore, the absolute value of the power supply neutral point line current In increases along with a lapse of time, whereas the absolute value of the power supply line current Is decreases in proportion to this.

Then, the power supply neutral point line current In becomes equal to the power supply line current Ir when the power supply line current Is becomes zero. As a result, the clamp voltage Vc2 becomes larger than the absolute value of the power supply phase voltage Vsn, and thereafter, the power supply neutral point line current In equal to the power supply line current Ir flows.

As described above, discharging of the clamp capacitor Cc2 through the neutral phase input line ACLn incurs a decrease in the power supply line current Is flowing through the input line ACLs (see FIG. 15).

Figure 17:
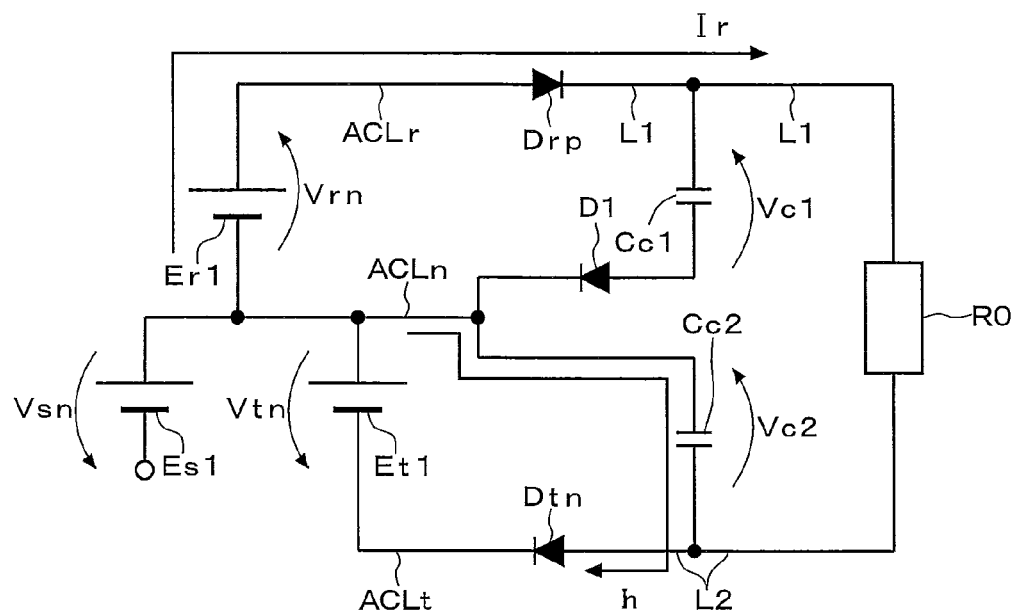
FIG. 17 A diagram showing the equivalent circuit of the direct AC power converting apparatus according to the first embodiment in an area 2.

Next, in an area 2 shown in FIG. 15, the transistors Srp and Stn are in conduction. FIG. 17 shows the equivalent circuit of the direct AC power converting apparatus in the area 2.

When the transistors Srp and Stn are brought into conduction in the area 2, a voltage Vrt (=Vrn−Vtn, hereinafter also referred to as a line voltage Vrt) between the input lines ACLr and ACLt is applied between the DC power supply lines L1 and L2. Accordingly, a current flows through the load R0 from the single-phase power supply Er1 via the transistor Srp.

On this occasion, the clamp capacitor Cc1 is not charged/discharged from the same reason as the reason for describing the area 1.

On the other hand, the clamp capacitor Cc2 is mainly charged. The reason for this will be described below. With reference to FIG. 15, the clamp voltage Vc2 is smaller than the maximum value V0 of the power supply phase voltage because of discharging of the clamp capacitor Cc2 in the area 1. In addition, the clamp voltage Vc2 is initially larger than the absolute value of the power supply phase voltage Vtn in the area 2. Accordingly, a potential of an anode of the diode Dtn is larger than a potential of a cathode of the diode Dtn, whereby the power supply line current It does not initially flow in the area 2.

Then, the clamp voltage Vc2 also rises as the absolute value of the power supply phase voltage Vtn increases from a time when the absolute value of the power supply phase voltage Vtn exceeds the clamp voltage Vc2. In other words, the clamp capacitor Cc2 is charged through the neutral phase input line ACLn. This is indicated by the power supply neutral point line current In flowing through the neutral phase input line ACLn in FIGS. 15 and 17.

On this occasion, the current (=power supply line current Ir) flowing through the load R0 flows through the input line ACLt via the diode Dtn. Accordingly, the charging current (=absolute value of the power supply neutral point line current In) of the clamp capacitor Cc2 through the neutral phase input line ACLn and the current through the load R0 flow through the input line ACLt. This incurs an increase in the power supply line current It flowing through the input line ACLt (see FIGS. 15 and 17). Note that a rate of change of the absolute value of the power supply phase voltage Vtn decreases along with a lapse of time, and thus the charging current flowing into the clamp capacitor Cc2 decreases as well. Along with this, the absolute value of the power supply line current Is also decreases along with a lapse of time.

As described above, the clamp capacitor Cc2 is repeatedly charged/discharged through the neutral phase input line ACLn when the normal operation is performed in the state in which the switch S1 is in conduction, and hence the symmetry of the power supply line currents is lost. The direct AC power converting apparatus according to the third embodiment is capable of preventing the symmetry of the power supply line currents as described above from being lost.

Figure 18:
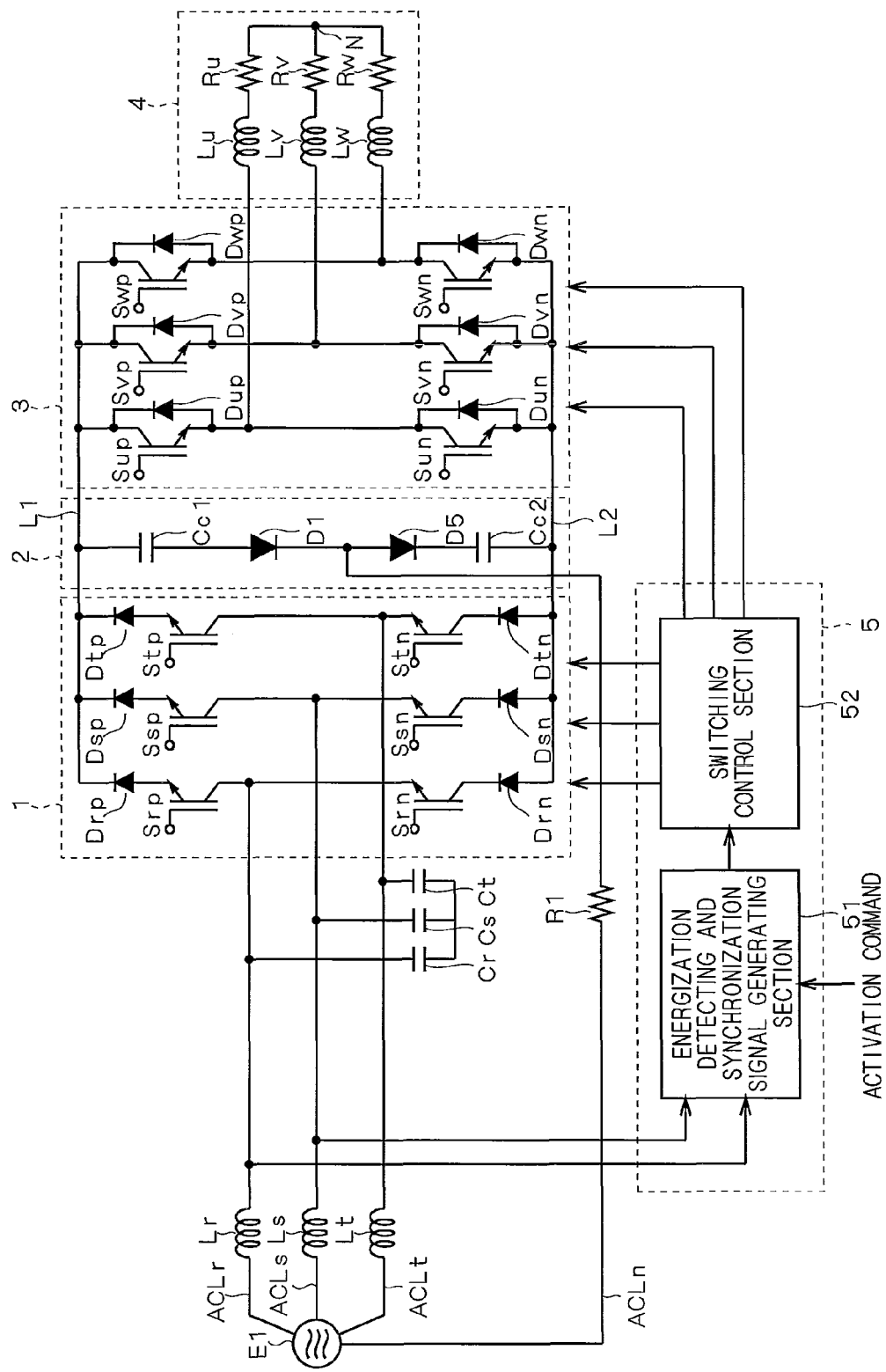
FIG. 18 A diagram showing an example of a conceptual configuration of a direct AC power converting apparatus according to a third embodiment.

FIG. 18 is a diagram showing an example of a conceptual configuration of the direct AC power converting apparatus according to the third embodiment. Compared with the direct AC power converting apparatus shown in FIG. 1, the switch S1 is not provided in the neutral phase input line ACLn and the clamp circuit 2 further includes a diode D5.

The diode D5 is connected in series with the diode D1 between the DC power supply lines L1 and L2. An anode and a cathode of the diode D5 are located on the DC power supply line L1 side and the DC power supply line L2 side, respectively. The neutral phase input line ACLn is connected between the diodes D1 and D5.

Charging operations of the clamp capacitors Cc1 and Cc2 are similar to those of the flowchart shown in FIG. 2. However, since the switch S1 is not provided, Steps ST3 and ST6 are not required.

FIG. 19 shows the power supply phase voltages Vrn, Vsn, and Vtn, the clamp voltage Vc2, the power supply line currents Ir, Is and It, and the power supply neutral point line current In, which are obtained in a case where the normal operation is performed in the direct AC power converting apparatus shown in FIG. 18.

Figure 20:
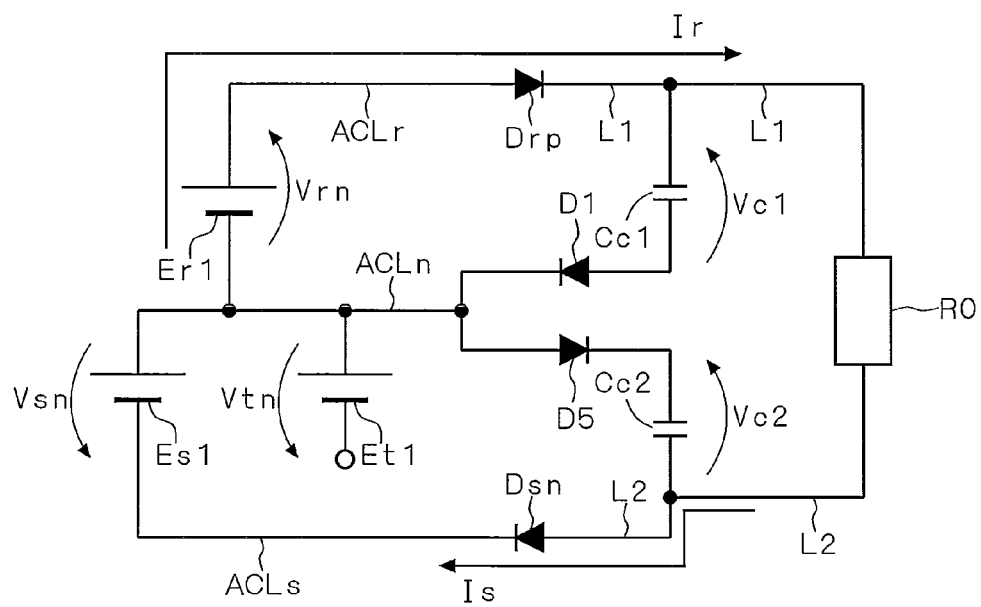
FIG. 20 A diagram showing an equivalent circuit of the direct AC power converting apparatus according to the third embodiment in an area 1.

FIG. 20 shows an equivalent circuit of the direct AC power converting apparatus according to the third embodiment in the area 1. In a similar manner as described with reference to FIG. 16, the current flows from the single-phase power supply Er1 to the load R0 through the transistor Srp, and the clamp capacitor Cc1 is not charged/discharged on this occasion.

On the other hand, the clamp capacitor Cc2 is not charged/discharged as well. The reason for this will be described below. Discharging of the clamp capacitor Cc2 is impeded by the diode D5. Accordingly, the clamp voltage Vc2 does not fall below the maximum value V0 of the power supply phase voltage (see the clamp voltage Vc2 of FIG. 19). Therefore, the clamp voltage Vc2 does not fall below the power supply phase voltage Vsn, whereby the charging current does not flow from the single-phase power supply Es1 to the clamp capacitor Cc2 through the neutral phase input line ACLn as well.

As described above, the clamp capacitor Cc2 is not charged/discharged, which incurs no increase or decrease in the power supply line current Is.

Figure 21:
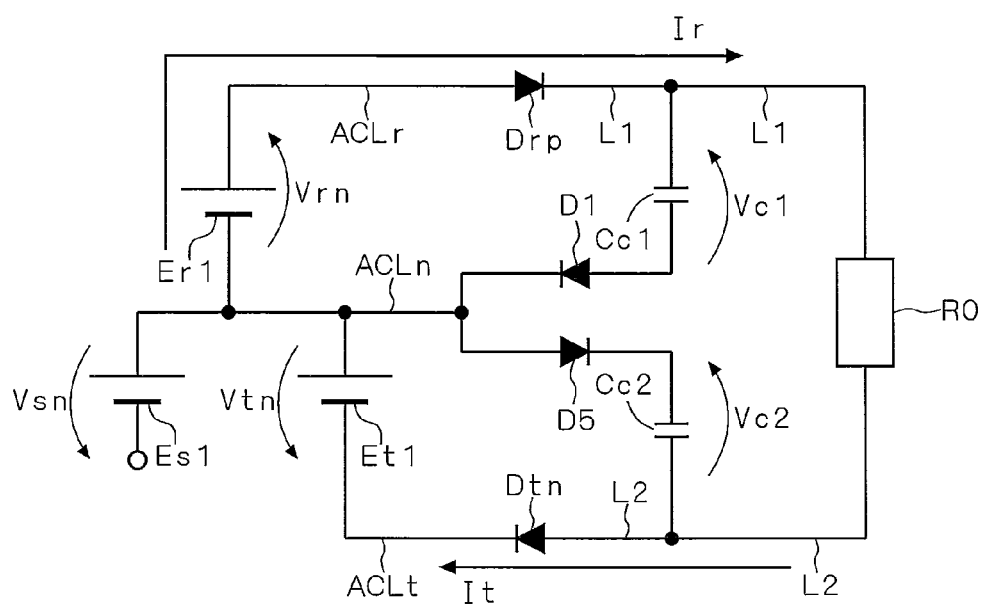
FIG. 21 A diagram showing the equivalent circuit of the direct AC power converting apparatus according to the third embodiment in an area 2.

FIG. 21 shows the equivalent circuit of the direct AC power converting apparatus according to the third embodiment in the area 2. In a similar manner as described with reference to FIG. 17, the current flows from the single-phase power supply Er1 to the load R0 through the transistor Srp in the area 1, and the clamp capacitor Cc1 is not charged/discharged on this occasion.

On the other hand, the clamp capacitor Cc2 is not charged/discharged as well. The reason for this will be described below. Discharging of the clamp capacitor Cc2 is impeded by the diode D5. Accordingly, the clamp voltage Vc2 is kept at the maximum value V0 of the power supply phase voltage. Therefore, the clamp voltage Vc2 does not fall below the power supply phase voltage Vtn, whereby the charging current does not flow from the single-phase power supply Et1 to the clamp capacitor Cc2 through the neutral phase input line ACLn.

As described above, the clamp capacitor Cc2 is not charged/discharged, which incurs no increase or decrease in the power supply line current It.

Accordingly, even if the power supply E1 and the current-source converter 1 are connected to each other through the neutral phase input line ACLn in the normal operation, it is possible to prevent the clamp capacitor Cc2 from being charged/discharged through the neutral phase input line ACLn. This is indicated by the power supply neutral point line current In in FIG. 19. Therefore, it is possible to prevent a loss of the symmetry of the power supply line currents Ir, Is and It (also see the power supply line currents Ir, Is and It of FIG. 19).

Figure 22:
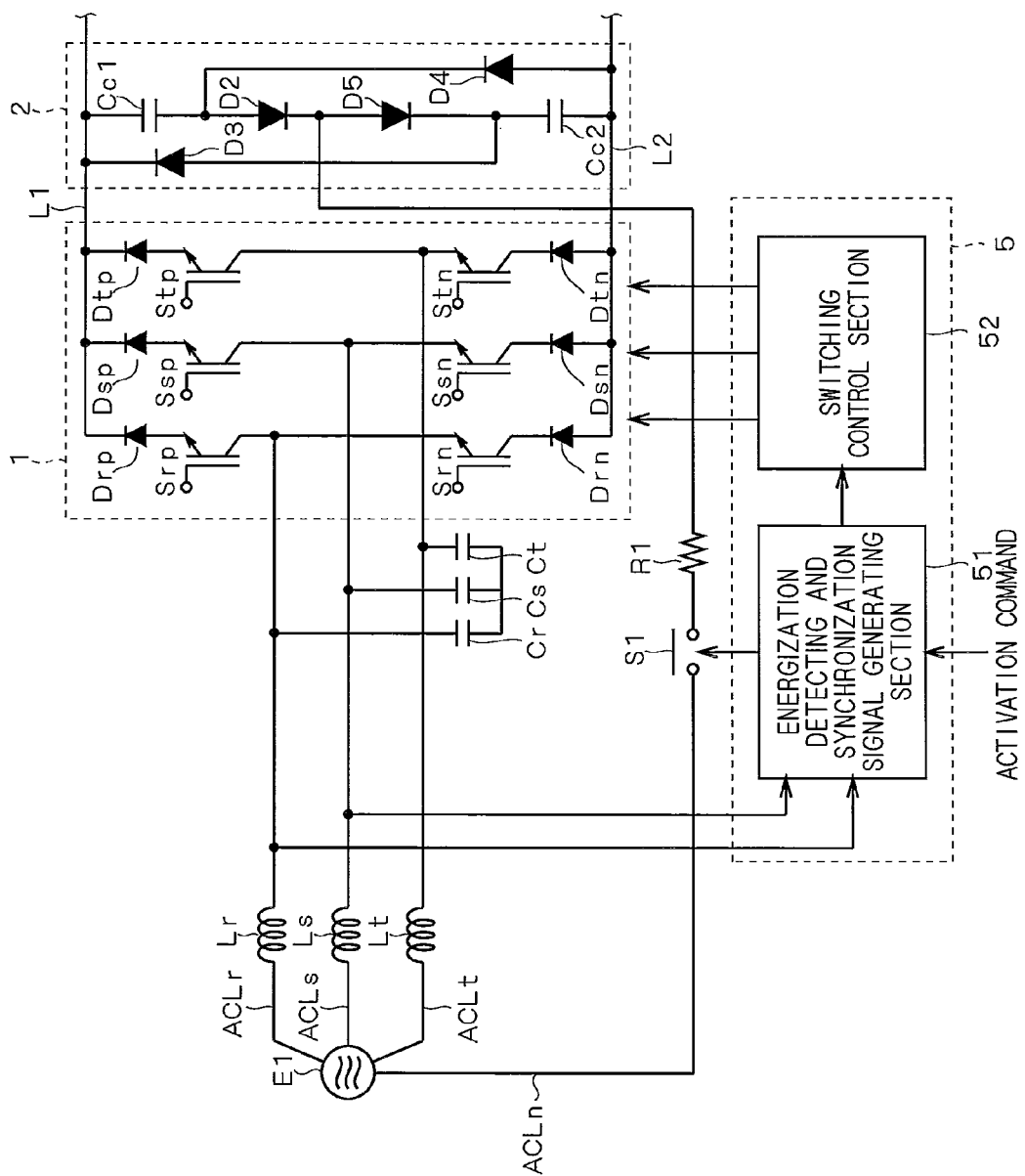
FIG. 22 A diagram showing another example of the conceptual configuration of the direct AC power converting apparatus according to the third embodiment.
Figure 24:
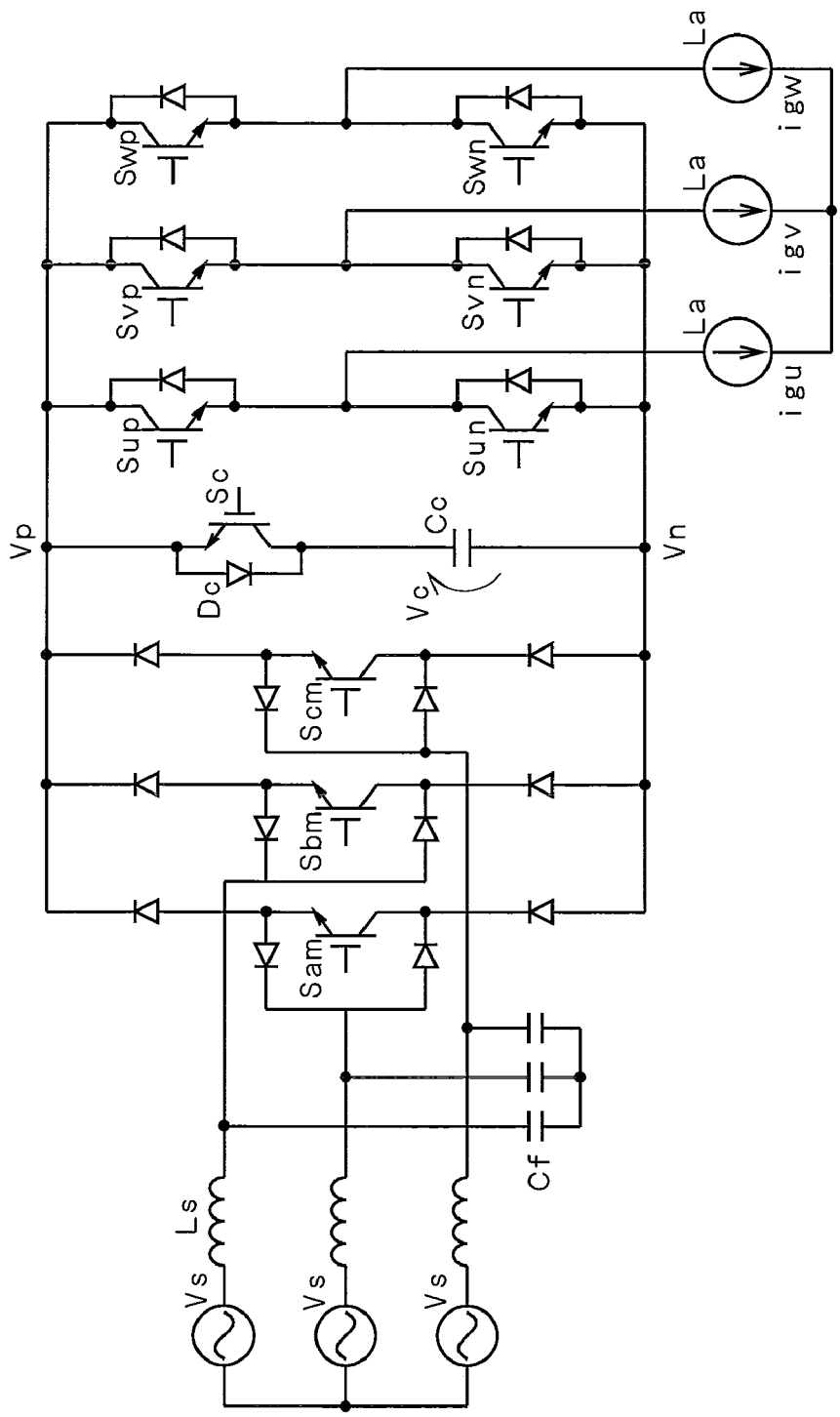
FIG. 24 A configuration diagram showing a power converting apparatus of Non-Patent Document 1.

FIG. 22 shows another example of the conceptual configuration of the direct AC power converting apparatus according to the third embodiment. Compared with the direct AC power converting apparatus shown in FIG. 10, the diode D5 is further provided.

The diode D5 is connected, between the DC power supply lines L1 and L2, in series with the diode D2. An anode and a cathode of the diode D5 are located on the DC power supply line L1 side and the DC power supply line L2 side, respectively. The neutral phase input line ACLn is connected between the diodes D2 and D5.

Even when the direct AC power converting apparatus as described above is shifted to the normal operation while the switch S1 is held in conduction, it is possible to prevent the clamp capacitor Cc2 from being charged/discharged through the neutral phase input line ACLn, which prevents a loss of symmetry of the power supply line currents Ir, Is and It.

Note that while the switch S1 is not necessarily required to be provided on the neutral phase input line ACLn, it is possible to prevent degradation in waveforms of the power supply line currents Ir, Is and It in the normal operation in a case where the switch S1 is provided to shift to the normal operation with the switch S1 brought into nonconcution. This will be described below in detail.

FIG. 23 shows the power supply phase voltages Vrn, Vsn and Vtn, and the voltage between the DC power supply lines L1 and L2 which are obtained in a case where the normal operation is performed in this direct AC power converting apparatus.

As described in the first embodiment, the switching operation indicated by the broken line in FIG. 8 is performed in the normal operation. Description is given of, for example, a case of a current vector mode 1 in which any of the switching modes for outputting the current vectors I(rs) and I(rt) (also see FIG. 7) is selected. In the current vector mode 1, the transistor Srp is in the conductive state, and the transistors Ssn and Stn are repeatedly switched therebetween in an exclusive manner. As a result, two line voltages Vrs and Vrt are each applied between the DC power supply lines L1 and L2 alternately and repeatedly. Note that in FIG. 23, envelopes of two are shown, and a square-wave-shape DC voltage between the DC power supply lines L1 and L2, which takes any one of those alternately and repeatedly, is omitted. The description above is also applicable to other current vector mode if a phase is appropriately read.

Meanwhile, in a case where the normal operation is performed with the switch S1 brought into nonconduction, as described in the first embodiment, the reflux current flows through the clamp capacitors Cc1 and Cc2 when a load power factor on the voltage-source inverter 3 side decreases. For example, in a case where the current flowing through the motor 4 delays with respect to the voltage between the DC power supply lines L1 and L2 due to the load power factor on the voltage-source inverter 3 side, the reflux current flows from the motor 4 to the DC power supply lines L1 and L2 in a given period, whereby the clamp capacitors Cc1 and Cc2 are charged in the state of being connected in series with each other. The charging voltage (voltage between both ends of a pair of the clamp capacitors Cc1 and Cc2) on this occasion is determined based on the load power factor. On the other hand, the clamp capacitors Cc1 and Cc2 are discharged in the state of being connected in parallel with each other when the square-wave-shape DC voltage between the DC power supply lines L1 and L2 falls below the clamp voltages Vc1 and Vc2. Note that the clamp capacitors Cc1 and Cc2 are charged in the state of being connected in series with each other and discharged in the state of being connected in parallel with each other, and accordingly the discharging voltage is a half of the charging voltage.

In other words, since the reflux current does not flow in a case where the load power factor is one, the clamp capacitors Cc1 and Cc2 are not charged/discharged. The reason for this will be described below. In the case where the switch S1 is in nonconduction, the voltages (line voltages) between ones of the input lines ACLr, ACLs and ACLt are applied between the power supply lines L1 and L2. Therefore, the voltage between both ends of a pair of the clamp capacitors Cc1 and Cc2 is equal to the maximum value V1 of the line voltage. Assuming that the electrostatic capacitances of the clamp capacitors Cc1 and Cc2 are equal to each other, the clamp voltages Vc1 and Vc2 are a half value of the maximum value V1. On the other hand, the minimum value of the square-wave-shape DC voltage between the DC power supply lines L1 and L2 is a half value of the maximum value V1 as well. Therefore, the DC voltage between the DC power supply lines L1 and L2 does not fall below the clamp voltages Vc1 and Vc2, whereby the clamp capacitors Cc1 and Cc2 are not discharged.

The above description has been given of the operation of the clamp circuit 2 when the normal operation is performed with the switch S1 brought into nonconduction and when the load power factor is one. That is, the clamp capacitors Cc1 and Cc2 serve a function of causing the reflux current from the motor 4 to flow when the load power factor is small, and does not contribute to the operation when the load power factor is one.

On the other hand, in the case where the normal operation is performed with the switch S1 being held in conduction, the power supply phase voltage is applied to each of the clamp capacitors Cc1 and Cc2. The power supply phase voltage is $1/\sqrt{3}$ of the line voltage. Therefore, the clamp voltages Vc1 and Vc2 are the maximum value V0 of the power supply phase voltage, that is, $1/\sqrt{3}$ of the maximum value V1 of the line voltage.

The minimum value of the DC voltage between the DC power supply lines L1 and L2 is a half value of the maximum value V1, and thus the DC voltage between the DC power supply lines L1 and L2 falls below the clamp voltages Vc1 and Vc2 even if the load power factor is one (see FIG. 23). Accordingly, the clamp capacitors Cc1 and Cc2 are discharged in the state of being connected in parallel with each other in a period in which the DC voltage between the DC power supply lines L1 and L2 falls below the clamp voltages Vc1 and Vc2. In this period, the clamp capacitors Cc1 and Cc2 supply an operating current to the motor 4 and the current from the power supply E1 does not flow through the motor 4. Therefore, the current does not flow through the input lines ACLr, ACLs and ACLt in this period, which degrades a waveform of the power supply line current.

As described above, when the switch S1 is provided on the neutral phase input line ACLn to shift to the normal operation with this brought into nonconduction, that is, when Step ST6 of FIG. 2 is performed to shift to the normal operation, it is possible to prevent the waveform of the power supply line current from degrading.

Note that the direct AC power converting apparatus according to the third embodiment may be applied to the direct AC power converting apparatus according to the second embodiment.

While the invention has been shown and described in detail, the foregoing description is in all aspects illustrative and not restrictive. It is therefore understood that numerous modifications and variations can be devised without departing from the scope of the invention.

The invention claimed is:

1. A direct AC power converting apparatus, comprising:
   a plurality of input lines to which an output of a multi-phase AC power supply including a neutral point is applied;
   a positive-side DC power supply line;
   a negative-side DC power supply line to which a potential lower than a potential applied to said positive-side DC power supply line is applied;
   a current-source power converter including a plurality of switch devices, converting a multi-phase AC voltage applied between ones of said plurality of input lines into a square-wave-shape DC voltage having two potentials by selection operations of said plurality of switch devices, and supplying said DC voltage between said positive-side DC power supply line and said negative-side DC power supply line;
   a plurality of input capacitors each provided between the ones of said plurality of input lines and functioning as a voltage source;
   a first diode provided between said positive-side DC power supply line and said negative-side DC power supply line and having an anode on said positive-side DC power supply line and a cathode on said negative-side DC power supply line side;
   first and second capacitors connected, between said positive-side DC power supply line and said negative-side DC power supply line, in series with said first diode;
   a neutral phase input line connecting said neutral point and a point between said first capacitor and said second capacitor;
   a voltage-source power converter converting said DC voltage into a square-wave-shape AC voltage and outputting to an inductive multi-phase load;
   a resistor inserted in any one of said plurality of input lines and said neutral phase input line; and
   a control section controlling the selection operations of said plurality of switch devices, performing voltage doubler rectification on a phase voltage for one phase which is applied between one of said plurality of input lines and said neutral phase input line, and supplying for charging of said first capacitor and said second capacitor through said resistor.

2. The direct AC power converting apparatus according to claim 1, further comprising:
   a second diode connected, between said positive-side DC power supply line and said negative-side DC power supply line, in series with said first diode, and having an anode on said positive-side DC power supply line side and a cathode on said negative-side DC power supply line side,
   wherein said neutral phase input line is connected between said first and second diodes.

3. The direct AC power converting apparatus according to claim 1, further comprising:
   a switch provided on said neutral phase input line,
   wherein said control section supplies for charging of said first capacitor and said second capacitor in a state in which said switch is in conduction, and brings said switch into nonconduction after a lapse of a predetermined period of time.

4. The direct AC power converting apparatus according to claim 2, further comprising:
   a switch provided on said neutral phase input line,
   wherein said control section supplies for charging of said first capacitor and said second capacitor in a sate in which said switch is in conduction, and brings said switch into nonconduction after a lapse of a predetermined period of time.

5. The direct AC power converting apparatus according to claim 1, wherein said resistor is provided on said neutral phase input line.

6. The direct AC power converting apparatus according to claim 2, wherein said resistor is provided on said neutral phase input line.

7. The direct AC power converting apparatus according to claim 3, wherein said resistor is provided on said neutral phase input line.

8. The direct AC power converting apparatus according to claim 4, wherein said resistor is provided on said neutral phase input line.

9. The direct AC power converting apparatus according to claim 1, wherein said resistor is provided in one of said plurality of input lines,
   the direct AC power converting apparatus further comprising reactors connected in parallel with said resistor.

10. The direct AC power converting apparatus according to claim 2, wherein said resistor is provided in one of said plurality of input lines,
    the direct AC power converting apparatus further comprising reactors connected in parallel with said resistor.

11. The direct AC power converting apparatus according to claim 3, wherein said resistor is provided in one of said plurality of input lines,
    the direct AC power converting apparatus further comprising reactors connected in parallel with said resistor.

12. The direct AC power converting apparatus according to claim 4, wherein said resistor is provided in one of said plurality of input lines,
    the direct AC power converting apparatus further comprising reactors connected in parallel with said resistor.

13. The direct AC power converting apparatus according to claim 1, wherein said first capacitor is provided on said positive-side DC power supply line side with respect to said second capacitor, and said first diode is provided between said first capacitor and said second capacitor,
    the direct AC power converting apparatus further comprising:
    a third diode having an anode connected between said first diode and said second capacitor and a cathode connected to said positive-side DC power supply line; and
    a fourth diode having an anode connected to said negative-side DC power supply line and a cathode connected between said first diode and said first capacitor.

* * * * *